(12) United States Patent
Yoo et al.

(10) Patent No.: US 12,541,470 B2
(45) Date of Patent: Feb. 3, 2026

(54) SECURITY-ENHANCED STORAGE DEVICE

(71) Applicant: SAMSUNG ELECTRONICS CO., LTD., Suwon-si (KR)

(72) Inventors: Hyunjoon Yoo, Suwon-si (KR); Youngsik Moon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 41 days.

(21) Appl. No.: 18/756,258

(22) Filed: Jun. 27, 2024

(65) Prior Publication Data

US 2025/0086121 A1    Mar. 13, 2025

(30) Foreign Application Priority Data

Sep. 12, 2023 (KR) .................. 10-2023-0121272

(51) Int. Cl.
*G06F 12/14* (2006.01)
*H04L 9/14* (2006.01)

(52) U.S. Cl.
CPC ............ *G06F 12/1408* (2013.01); *H04L 9/14* (2013.01); *G06F 2212/1052* (2013.01)

(58) Field of Classification Search
CPC ...... G06F 12/1408; G06F 21/72; G06F 21/86; H04L 9/14
See application file for complete search history.

(56) References Cited

U.S. PATENT DOCUMENTS

| | | | |
|---|---|---|---|
| 6,983,378 B1 | 1/2006 | Kokubo | |
| 8,832,402 B2 | 9/2014 | Goss et al. | |
| 8,938,624 B2 | 1/2015 | Obukhov et al. | |
| 9,772,922 B2 | 9/2017 | Huang et al. | |
| 10,607,018 B2 | 3/2020 | Amidi | |
| 10,963,594 B2 | 3/2021 | Lewis | |
| 11,651,071 B2 | 5/2023 | Karpinskyy et al. | |
| 2010/0281223 A1* | 11/2010 | Wolfe | G06F 12/0808 713/193 |
| 2012/0185636 A1* | 7/2012 | Leon | H01L 23/576 711/E12.001 |
| 2016/0203086 A1 | 7/2016 | Ng et al. | |
| 2016/0291891 A1* | 10/2016 | Cheriton | G06F 3/064 |
| 2018/0091317 A1* | 3/2018 | Sieh | G06K 19/14 |
| 2021/0334414 A1* | 10/2021 | Kwak | G06F 3/0604 |

(Continued)

FOREIGN PATENT DOCUMENTS

KR    10-2021-0130363 A    11/2021

*Primary Examiner* — Shanto Abedin
(74) *Attorney, Agent, or Firm* — Sughrue Mion, PLLC

(57) ABSTRACT

Provided is a storage device with enhanced security. The storage device includes: a security pad; a non-volatile memory device; and a storage controller including a sensing pin connected to the security pad. The storage controller is configured to: classify data corresponding to an input/output request for the non-volatile memory device as hot data or cold data, based on an access frequency with respect to the data; encrypt write data to be stored in the non-volatile memory device; and perform a data protection operation of encrypting the hot data, based on a signal change at the sensing pin according to a change in electrical contact of a physical sensing structure, the physical sensing structure including the security pad and a locking structure. A locking structure in electrical contact with a security pad extends through a through hole defined in the substrate.

20 Claims, 25 Drawing Sheets

(56) References Cited

U.S. PATENT DOCUMENTS

| | | | |
|---|---|---|---|
| 2023/0058668 A1* | 2/2023 | Roberts | G06F 12/1408 |
| 2023/0206222 A1* | 6/2023 | Kirillov | G06Q 20/3278 |
| | | | 705/69 |

* cited by examiner

SECURITY-ENHANCED STORAGE DEVICE

CROSS-REFERENCE TO RELATED APPLICATION

This application claims priority to Korean Patent Application No. 10-2023-0121272, filed on Sep. 12, 2023, in the Korean Intellectual Property Office, the disclosure of which is incorporated by reference herein in its entirety.

BACKGROUND

The present disclosure relates to a semiconductor device, and more particularly to a security-enhanced storage device.

Solid-state drive (SSD) devices are used as data storage devices and have a fast access rate, high density, and stability against external shocks. Also, the data transfer speed of SSD devices is significantly faster than that of hard disk drives (HDD).

Security is demanded to protect data stored in SSD devices. Therefore, data is encrypted, security keys are used in the encryption process, and storage and management of the security keys are important. SSD devices are media with the advantages of low power consumption and high speed, but there is a high possibility of security problems such as data leakage in the case of loss or theft.

SUMMARY

One or more example embodiments provide storage devices capable of efficiently managing encrypted data and security keys when opening or damage to a casing is detected.

According to an aspect of an embodiment, a storage device includes: a substrate including at least one security pad; at least one non-volatile memory device on the substrate; and a storage controller on the substrate and including a sensing pin connected to the at least one security pad. The storage controller is configured to: control the at least one non-volatile memory device; classify data corresponding to an input/output request for the at least one non-volatile memory device as hot data or cold data, based on an access frequency with respect to the data, wherein the hot data has a higher access frequency than the cold data; encrypt write data to be stored in the at least one non-volatile memory device; and perform a data protection operation of encrypting the hot data, based on a signal change at the sensing pin according to a change in electrical contact of a physical sensing structure, the physical sensing structure including the at least one security pad and at least one locking structure. A locking structure in electrical contact with a security pad extends through a through hole defined in the substrate.

According to another aspect of an embodiment, a storage device includes: a substrate; at least one non-volatile memory device on the substrate; and a storage controller on the substrate and including a sensing pin connected to a sensing capacitor. The storage controller is configured to: control the at least one non-volatile memory device; classify data corresponding to an input/output request for the at least one non-volatile memory device as hot data or cold data, based on an access frequency with respect to the data, wherein the hot data has a higher access frequency than the cold data; encrypt write data to be stored in the at least one non-volatile memory device; and perform a data protection operation of encrypting the hot data, based on a signal change of the sensing pin according to a change in electrical contact of a physical sensing structure, the physical sensing structure including the sensing capacitor and the sensing pin.

According to another aspect of an embodiment, a method of operating a storage device that includes a storage controller, a sensing capacitor and a sensing pin connected to the sensing capacitor is provided. The method includes: generating and outputting a first security key and a second security key; encrypting write data by using the first security key to generate encrypted write data; encrypting the first security key by using the second security key to generate a first encrypted security key; storing the first encrypted security key and the second security key in at least one non-volatile memory of the storage device; detecting an abnormal access to the storage device based on a signal change at the sensing pin; and performing a data protection operation on data stored in the storage device based on the abnormal access being detected. The data protection operation includes blocking the second security key from being output.

BRIEF DESCRIPTION OF DRAWINGS

The above and other aspects will be more apparent from the following description of embodiments taken in conjunction with the accompanying drawings, in which.

DETAILED DESCRIPTION

Hereinafter, embodiments will be described in detail with reference to the accompanying drawings. Embodiments described herein are example embodiments, and thus, the present disclosure is not limited thereto, and may be realized in various other forms. Each embodiment provided in the following description is not excluded from being associated with one or more features of another example or another embodiment also provided herein or not provided herein but consistent with the present disclosure. It will be understood that when an element or layer is referred to as being "on," "connected to" or "coupled to" another element or layer, it can be directly on, connected or coupled to the other element or layer, or intervening elements or layers may be present. By contrast, when an element is referred to as being "directly on," "directly connected to" or "directly coupled to" another element or layer, there are no intervening elements or layers present. As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, or all of a, b, and c. It will be also understood that, even if a certain step or operation of manufacturing an apparatus or structure is described later than another step or operation, the step or operation may be performed later than the other step or operation unless the other step or operation is described as being performed after the step or operation.

Figure 1:
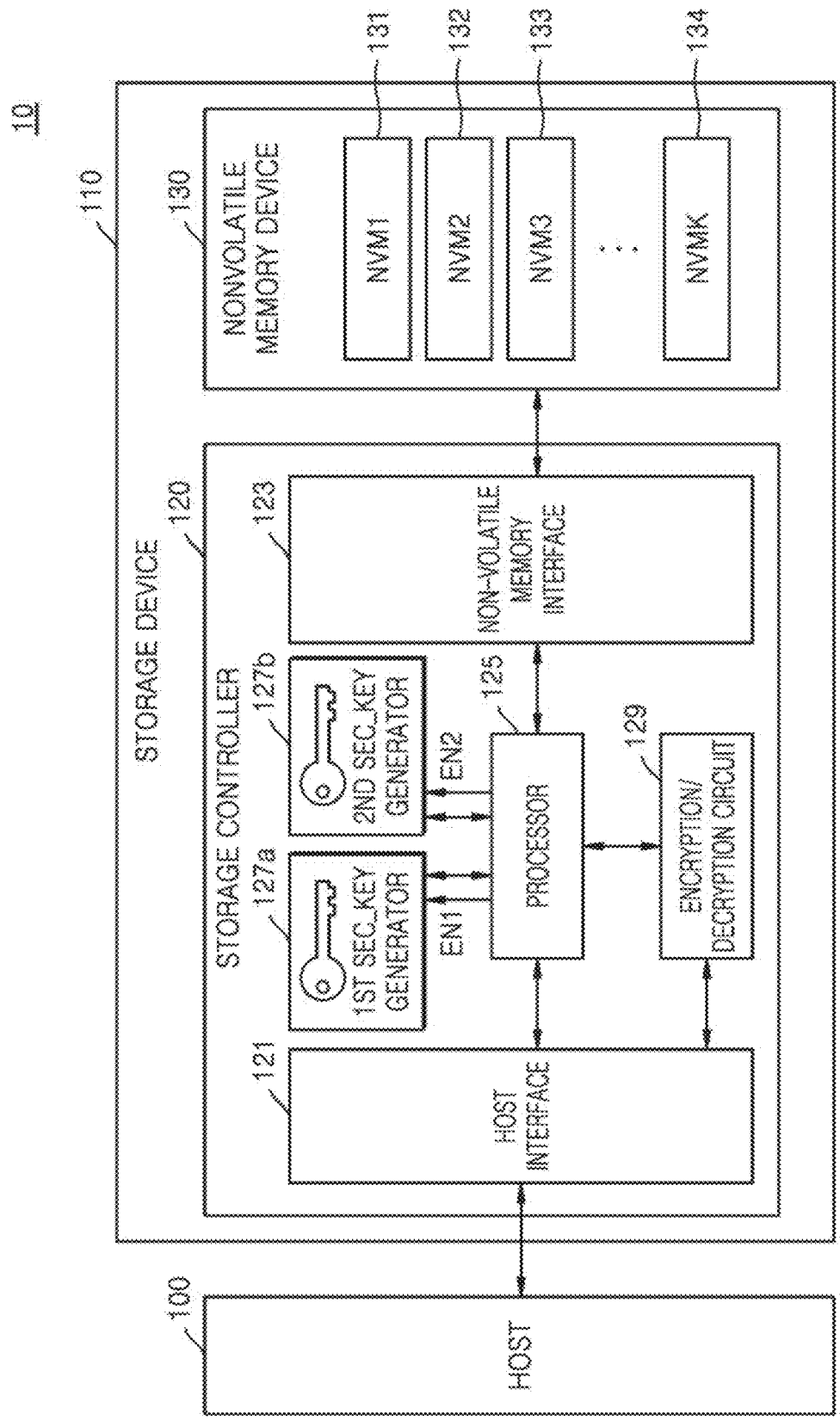
FIG. 1 is a diagram for describing a storage system including a storage device, according to embodiments.

FIG. 1 is a diagram for describing a storage system including a storage device, according to embodiments.

Referring to FIG. 1, a storage system 10 includes a host 100 and a storage device 110. The storage system 10 may be included in at least one of various information processing devices such as a personal computer, a laptop computer, a server, a workstation, a smartphone, and a tablet PC. The host 100 may access the storage device 110. For example, the host 100 may transmit a command to the storage device 110 to store data in the storage device 110 or read data stored in the storage device 110. The storage device 110 may include a storage controller 120 and a non-volatile memory device 130. The storage device 110 may operate in response to the control from the host 100. For example, the storage controller 120 may store data in or read data from the non-volatile memory device 130 based on a command issued by the host 100.

The storage controller 120 may include a processor 125, first and second security key generators (i.e., generation circuits) 127a and 127b, an encryption/decryption circuit 129, a host interface 121, and a non-volatile memory interface 123. The storage controller 120 may communicate with the host 100 through the host interface 121. For example, the host interface 121 may include at least one from among various host interfaces such as a Peripheral Component Interconnect express (PCI-express) interface, a non-volatile memory express (NVMe) interface, a Serial ATA (SATA) interface, a Serial Attached SCSI (SAS) interface, and a Universal Flash Storage (UFS) interface. The storage controller 120 may communicate with the non-volatile memory device 130 through the non-volatile memory interface 123. For example, the non-volatile memory interface 123 may be a NAND interface.

The processor 125 may control the overall operation of the storage controller 120. The processor 125 may control components (e.g., 121, 123, 127a, 127b, and 129) included in the storage controller 120. The processor 125 may receive requests and logical addresses corresponding to the requests from the host 100 through the host interface 121, generate commands and physical addresses respectively corresponding to the requests and the logical addresses, and provide the commands and the physical addresses to the non-volatile memory device 130 through the non-volatile memory interface 123.

The first and second security key generators 127a and 127b may generate first and second security keys under the control of the processor 125. For example, the first and second security key generators 127a and 127b may be activated based on first and second enable signals EN1 and EN2 provided by the processor 125. According to embodiments, there may be a plurality of security keys. For example, when the first and second security key generators 127a and 127b generate a first security key and a second security key, the first security key may be used to encrypt/decrypt data provided by the host 100 or the non-volatile memory device 130, and the second security key may be used to encrypt the first security key.

The encryption/decryption circuit 129 encrypts data or a security key or decrypts encrypted data or an encrypted security key, under the control of the processor 125. Based on a command from the host 100, the storage controller 120 may store data encrypted through the encryption/decryption circuit 129 in the non-volatile memory device 130 or return data decrypted through the encryption/decryption circuit 129 to the host 100.

The non-volatile memory device 130 may be used as a storage medium of the storage device 110 and may be connected to the storage controller 120 through at least one channel. The non-volatile memory device 130 may receive commands and physical addresses from the storage controller 120 and store (or program) write data (e.g., metadata and user data) therein or provide read data to the storage controller 120. The non-volatile memory device 130 includes a plurality of non-volatile memories 131, 132, 133, and 134, and the plurality of non-volatile memories 131, 132, 133, and 134 may be connected to the plurality of channels, respectively. The plurality of non-volatile memories 131, 132, 133, and 134 may each include a NAND flash memory. According to another embodiment, the plurality of non-volatile memories 131, 132, 133, and 134 may each include a phase change random access Memory (PRAM), a resistance random access Memory (RRAM), a nano floating gate memory (NFGM), a polymer memory (PoRAM), a magnetic random access memory (MRAM), a ferroelectric random access memory (FRAM), or a memory similar thereto.

Figure 2A:
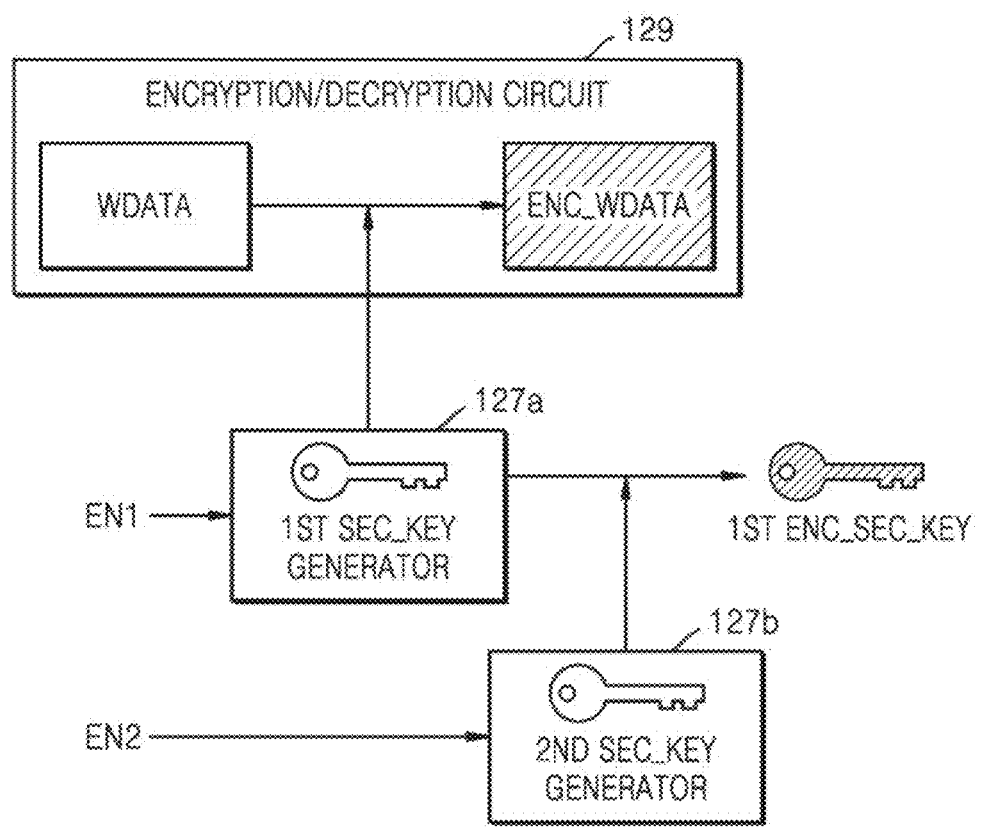
FIGS. 2A and 2B are diagrams for describing first and second security key generators of FIG. 1.
Figure 2B:
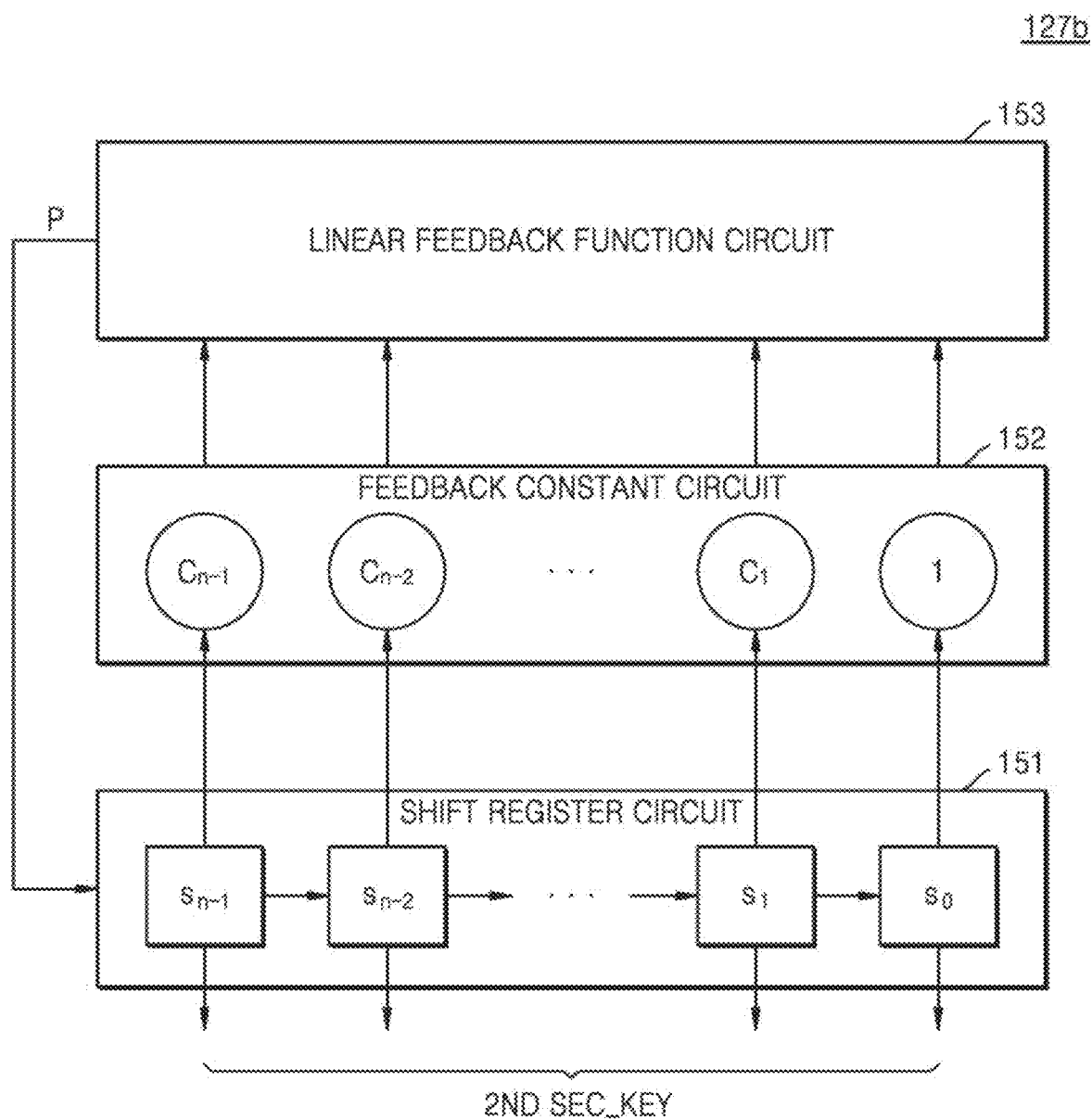

FIGS. 2A and 2B are diagrams for describing the first and second security key generators 127a and 127b of FIG. 1.

Referring to FIGS. 1 and 2A, the first and second security key generators 127a and 127b may generate, respectively, a first security key 1ST SEC_KEY and a second security key 2ND SEC_KEY to be used by the encryption/decryption circuit 129. A first security key generator 127a may be activated in response to a first enable signal EN1 provided by the processor 125 and generate the first security key 1ST SEC_KEY. The encryption/decryption circuit 129 may generate encrypted write data ENC_WDATA by encrypting write data WDATA to be stored in the non-volatile memory device 130 by using the first security key 1ST SEC_KEY.

A second security key generator 127b may be activated in response to a second enable signal EN2 provided by the processor 125 and generate the second security key 2ND SEC_KEY. The second security key generator 127b may generate a first encrypted security key 1ST ENC_SEC_KEY by encrypting the first security key 1ST SEC_KEY by using the second security key 2ND SEC_KEY. As shown in FIG. 2B, the second security key generator 127b may include a linear feedback shift register (LFSR) that generates and outputs a linear random number sequence based on a primitive polynomial. The LFSR may include a shift register circuit 151, a feedback constant circuit 152, and a linear feedback function circuit 153.

The shift register circuit 151 includes n shift registers S0, S1, . . . , and Sn−1, and the shift registers S0, S1, . . . , and Sn−1 may receive and shift an output P of the linear feedback function circuit 153, and outputs s0, s1, . . . , and sn−1 of ends of the shift registers S0, S1, . . . , and Sn−1 may be output to ends of the linear feedback function circuit 153, respectively. The feedback constant circuit 152 takes mode values of 0 and 1 as a coefficient of a primitive polynomial, where are values of Ci (C0=1, i=1, 2 . . . ) indicating the connection state with respect to the shift register circuit 151. The feedback constant circuit 152 may receive the outputs s0, s1, . . . , and sn−1 of the shift register circuit 151 and output the outputs s0, s1, . . . , and sn−1 to the linear feedback function circuit 153 together with its own constant value Ci (C0=1, i=1, 2 . . . ). The linear feedback function circuit 153 receives the outputs s0, s1, . . . , and sn−1 of the feedback constant circuit 152 and the ends of the shift register circuit 151, generates the output P, and outputs the output P to the shift register circuit 151. The output P may be represented by the Equation shown below.

$$P = s_0 + C_1 s_1 + \ldots + C_{n-1} s_{n-1}$$ [Equation]

The operation process of the LFSR is as follows. The linear feedback function circuit 153 calculates and outputs the output P. Thereafter, the shift register circuit 151 outputs all bits s0, s1, . . . , and sn−1, and receives and shifts the output P of the linear feedback function circuit 153. The outputs s0, s1, . . . , and sn−1 of the shift registers S0, S1, . . . , and Sn−1 are output to the feedback constant circuit 152. The feedback constant circuit 152 receives the outputs s0, s1, . . . , and sn−1 of the shift register circuit 151 and outputs the outputs s0, s1, . . . , and sn−1 to the linear feedback function circuit 153 together with its own constant value Ci (C0=1, i=1, 2 . . . ). Every time the operation process is performed, all bits s0, s1, . . . , and sn−1 of the shift register circuit 151 may be output as random values. The output of the second security key generator 127b, represented by a random output value of the shift register circuit 151, may be used as the second security key 2ND SEC_KEY. The second security key 2ND SEC_KEY may be randomly determined each time a random output value of the second security key generator 127b is output.

In FIG. 2A, an encryption algorithm used by the first security key 1ST SEC_KEY and the second security key 2ND SEC_KEY to respectively encrypt the write data WDATA and the first security key 1ST SEC_KEY may be a symmetric key algorithm. However, embodiments are not limited thereto. According to an embodiment, the symmetric key algorithm may be an advanced encryption standard (AES) algorithm in which the length of each of the first security key 1ST SEC_KEY and the second security key 2ND SEC_KEY is any one of 128 bits, 192 bits, and 256 bits. However, embodiments are not limited thereto, and the length of each of the first security key 1ST SEC_KEY and the second security key 2ND SEC_KEY may be configured with various numbers of bits. Because the first security key 1ST SEC_KEY encrypts the write data WDATA, the first security key 1ST SEC_KEY may be referred to as a cryptographic key. Because the second security key 2ND SEC_KEY encrypts the first security key 1ST SEC_KEY used to encrypt the write data WDATA, the second security key 2ND SEC_KEY may be referred to as a security key.

For example, a plurality of first security keys 1ST SEC_KEY may be generated, and a single second security key 2ND SEC_KEY may be generated. The plurality of first security keys 1ST SEC_KEY may be used to encrypt various data additionally generated in relation to the write data WDATA, in addition to encryption of the write data WDATA. In this case, the second security key 2ND SEC_KEY may be used to encrypt each of the plurality of first security keys 1ST SEC_KEY.

Figure 3:
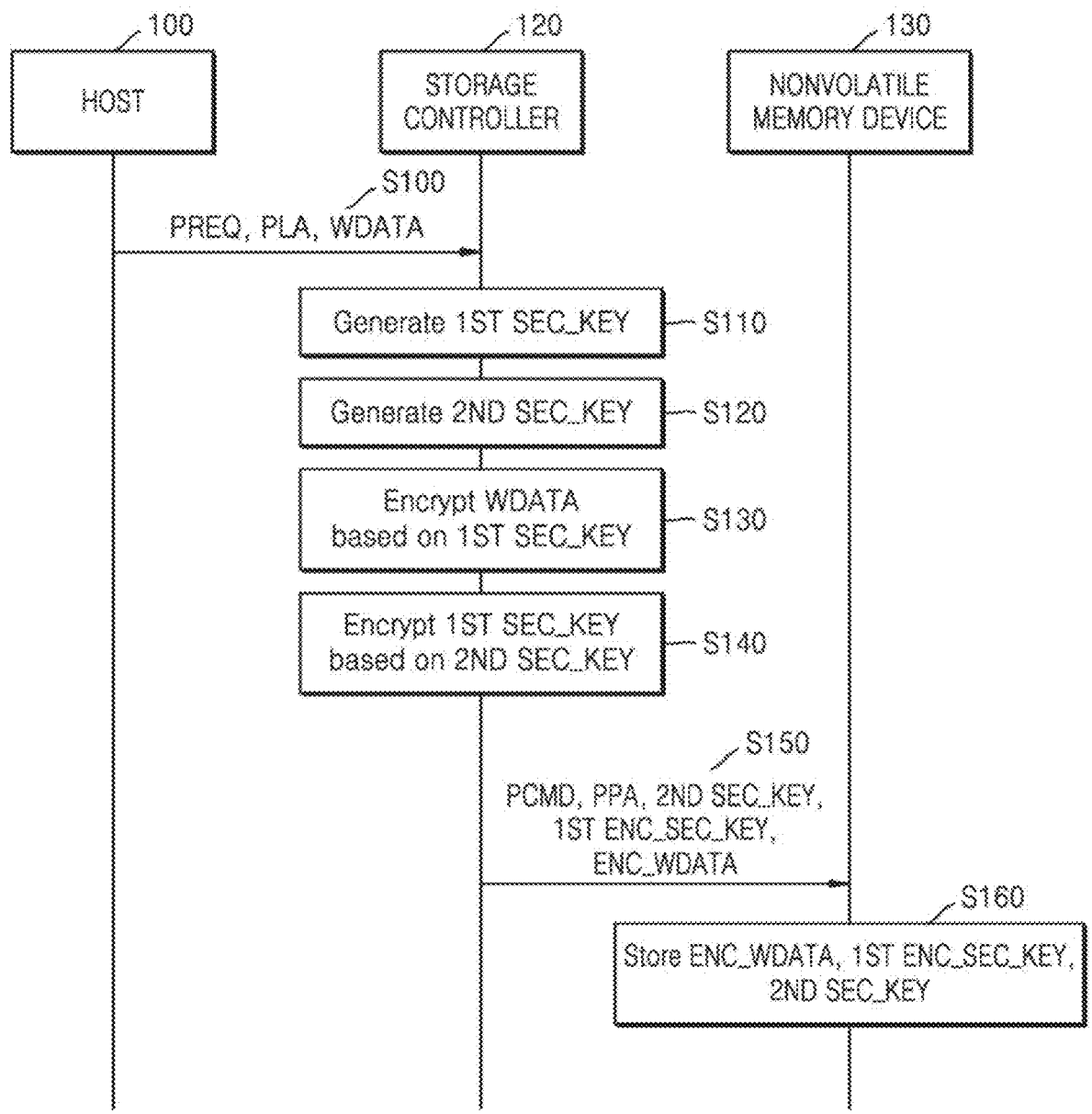
FIG. 3 is a diagram for describing the operation of a storage controller of FIG. 1.

FIG. 3 is a diagram for describing the operation of the storage controller 120 of FIG. 1.

Referring to FIG. 3, to store data (hereinafter, 'write data WDATA') in the non-volatile memory device 130, the host 100 may provide a program request PREQ, a program logical address PLA corresponding to the program request PREQ, and the write data WDATA to the storage controller 120 (operation S100). The storage controller 120 may generate the first security key 1ST SEC_KEY (operation S110) and generate the second security key 2ND SEC_KEY (operation S120). It is described that the first security key 1ST SEC_KEY and the second security key 2ND SEC_KEY are generated in response to the program request PREQ, but embodiments are not limited thereto, and the first security key 1ST SEC_KEY and the second security key 2ND SEC_KEY may be generated and stored in the non-volatile memory device 130 before operation S100. In this case, the first security key 1ST SEC_KEY and the second security key 2ND SEC_KEY may be loaded into the processor 125 in response to the program request PREQ.

The storage controller 120 may encrypt the write data WDATA based on the first security key 1ST SEC_KEY (operation S130) and encrypt the first security key 1ST SEC_KEY based on the second security key 2ND SEC_KEY (operation S140). The storage controller 120 may generate a program command PCMD based on the program request PREQ and generate program physical address PPA based on the program logical address PLA. The storage controller 120 may provide the program command PCMD, the program physical address PPA, the second security key 2ND SEC_KEY, the first encrypted security key 1ST ENC_SEC_KEY, and the encrypted write data ENC_WDATA to the non-volatile memory device 130 (operation S150). The non-volatile memory device 130 may store the second security key 2ND SEC_KEY, the first encrypted security key 1ST ENC_SEC_KEY, and the encrypted write data ENC_WDATA based on the program physical address PPA (operation S160).

Figure 4A:
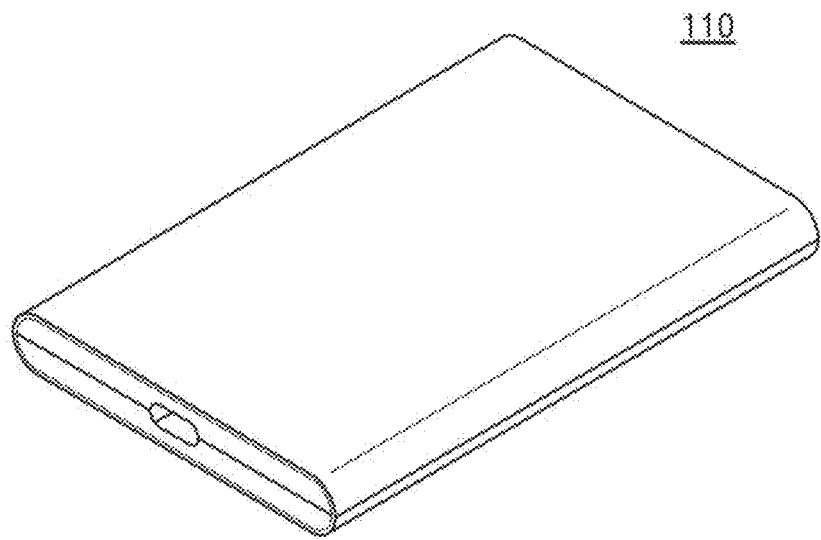
FIGS. 4A and 4B are diagrams for describing the storage device of FIG. 1.
Figure 4B:
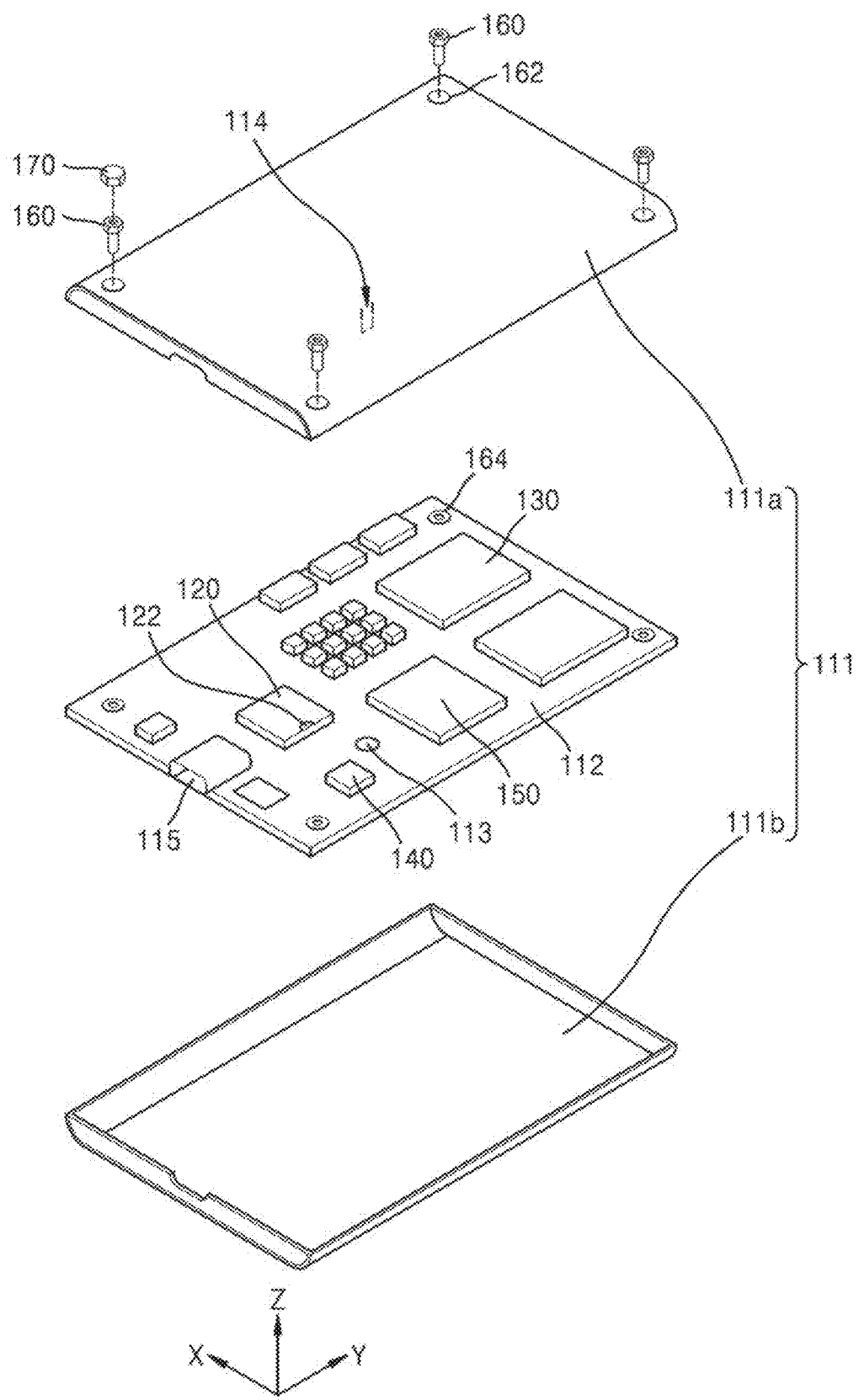
Figure 5A:
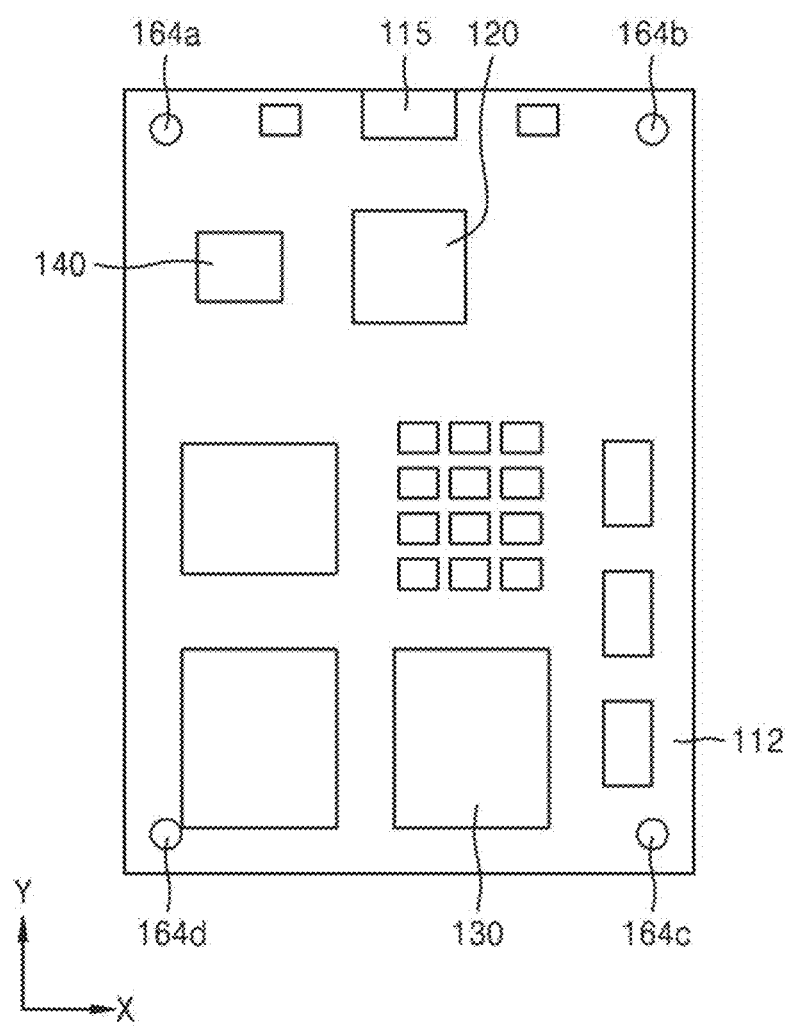
FIGS. 5A, 5B, and 5C are diagrams showing other examples of security pads and locking structures included in the storage device of FIG. 4B.
Figure 5B:
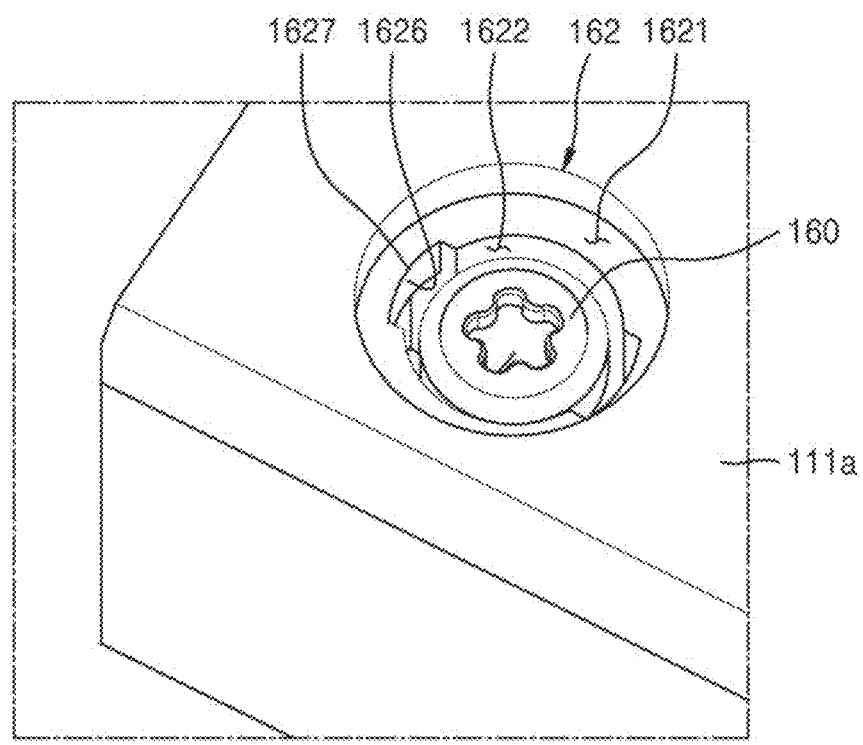
Figure 5C:
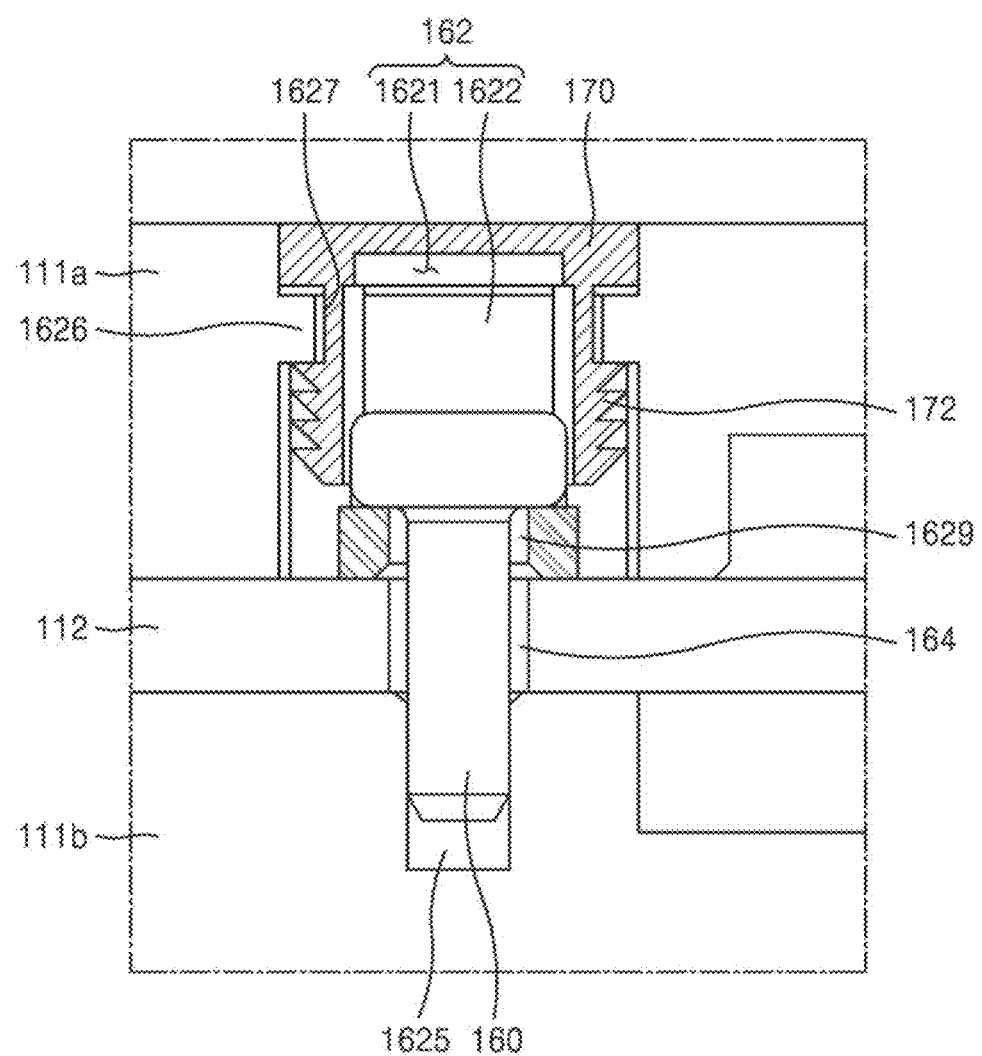

FIGS. 4A and 4B are diagrams for describing the storage device 110 of FIG. 1. FIG. 4A is a perspective view of the storage device 110, and FIG. 4B is an exploded perspective view of the storage device 110. FIGS. 5A, 5B, and 5C are diagrams for describing a substrate 112 and a locking structure 160 included in the storage device 110 of FIG. 4B.

Referring to FIGS. 4A and 4B, the storage device 110 may include the substrate 112, the storage controller 120, the non-volatile memory device 130, a security component 140, an auxiliary power supply 150, a casing 111, which encloses the substrate 112, the storage controller 120, the non-volatile memory device 130, and the security component 140, at least one security pad 113, at least one joining structure 114, the locking structure 160, and at least one sensing pin 122, wherein the storage controller 120, the non-volatile memory device 130, and the security component 140 are mounted or arranged on the substrate 112. The storage device 110 may further include a buffer memory, a bracket covering a plurality of electronic components (e.g., 120, 130, and 140), and a heat dissipation pad thermally connected to the electronic components (e.g., 120, 130, and 140). The buffer memory may store commands and data executed and processed by the storage controller 120, and may temporarily store data stored in the non-volatile memory device 130 or data to be stored in the non-volatile memory device 130. Also, the buffer memory may be used to drive software and/or firmware used to efficiently manage the non-volatile memory device 130. The buffer memory may include a volatile memory such as a static random access memory (SRAM), dynamic random access memory (DRAM), etc.

The substrate 112 may be a single-layer or multi-layer circuit board having a top surface and a bottom surfaces facing each other. For example, the substrate 112 may be a printed circuit board (PCB). A printed circuit board may include wires formed on the surface of or inside the printed circuit board and vias for connecting the wires. The wires may be printed circuit patterns for interconnecting electronic components. The substrate 112 may have a first side and a second side facing each other in a first direction (X direction). A connector 115 having a connection terminal for connection to an external host 100 may be provided on a first side of the substrate 112. The storage device 110 may be detachably attached to the host 100 through the connector 115. Therefore, the storage device 110 may be electrically connected to the host 100 through the connector 115.

The security component 140 may be implemented in the form of a secure memory and/or a secure element (SE). The security component 140 may process and/or store secure data such as cryptographic keys, sensitive data, and key codes. For example, the security component 140 may have a tamper-resistant function to be protected against tampering attacks such as microprobing, software attacks, eavesdropping, fault injection, etc.

When a main power supply of the storage device 110 is unable to supply power to the storage device 110 or when power supplied from the main power supply is abnormal, the auxiliary power supply 150 may supply electrical energy stored in the auxiliary power supply 150 to the storage device 110. The auxiliary power supply 150 may include a secondary battery and/or a capacitor. The secondary battery may be any secondary battery, e.g., a lithium ion battery, a lithium polymer battery, a nickel metal hydride (NiMH) battery, a nickel cadmium battery, and a lithium air battery. The capacitor may be, for example, an electrolytic capacitor, a tantalum capacitor, a multi-layer ceramic capacitor, an electric double layer capacitor, and a polymer film capacitor, but is not limited thereto.

The substrate 112 and the plurality of electronic components 120, 130, and 140 may be coupled to the inside of the casing 111 and fixedly positioned inside the casing 111. For example, the casing 111 may include a lower casing 111b, on which the substrate 112 is mounted, and an upper casing 111a, which is coupled to the lower casing 111b and covers the substrate 112 and the plurality of electronic components 120, 130, and 140. According to other embodiments, the upper casing 111a and the lower casing 111b may be formed integrally.

The substrate 112 may include the at least one security pad 113, and the casing 111 may include at least one bonding structure 114 for electrical contact with the security pad 113. The security pad 113 and the bonding structure 114 may constitute a single physical sensing structure, and may each include a conductive material for electrical contact. For example, as shown in FIG. 4B, when the security pad 113 is disposed on the top surface of the substrate 112, the bonding structure 114 may be formed at the upper casing 111a. However, embodiments are not limited thereto, and when the security pad 113 is disposed on the bottom surface of the substrate 112, the bonding structure 114 may be formed at the lower casing 111b.

Although FIG. 4B shows one security pad 113 and one bonding structure 114 only, according to embodiments, a plurality of security pads 113 and a plurality of bonding structures 114 may be included. Each secure pad-bond structure pair may constitute one physical sensing structure, and thus the storage device may include a plurality of physical sensing structures.

The substrate 112 may include a through hole 164 through which the locking structure 160 passes. The substrate 112 may be fixed to the casing 111 by the locking structure 160. The locking structure 160 may include locking means such as a bolts and screws. For example, the locking structure 160 may include a head with a relatively large diameter and a body extending long from the head. Therefore, the body of the locking structure 160 passes through the through hole 164 of the substrate 112, but the head of the locking structure 160 may be located inside the upper casing 111a.

The upper casing 111a may be coupled to the substrate 112 by the locking structure 160 while edge portions of the upper casing 111a are contacting a first surface of the substrate 112. A cap 170 covering the locking structure 160 may be assembled to the upper casing 111a. The cap 170 is irreversibly coupled to the upper casing 111a. In this regard, the cap 170 may be assembled to the upper casing 111a, but the cap 170 may not be detached from the upper casing 111a. For example, after the cap 170 is assembled to the upper casing 111a, if removed the cap 170 will be damaged. Therefore, because it is impossible to separate the cap 170 without damaging the cap 170, it is possible to detect whether at least part of a casing has been removed, separated, opened, or damaged by checking whether the cap 170 is damaged.

The upper casing 111a may include a locking member 162 through which the locking structure 160 passes. A portion of the locking structure 160 may be located in the inner space of the locking member 162. Therefore, the locking structure 160 may not protrude beyond the outer surface of the upper casing 111a. Locking structures 160 may be arranged at edge portions of the upper casing 111a and may be arranged at a plurality of locations other than the edge portions according to embodiments. Because the plurality of locking structures 160 have the same configuration, descriptions will be given below based on one locking structure 160.

Referring to FIG. 5A, the connector 115, the storage controller 120, the non-volatile memory device 130, and the security component 140 may be arranged on the substrate 112 similarly as in FIG. 4B. A plurality of through holes 164a to 164d may be arranged at the edge portions of the substrate 112.

Referring to FIGS. 5B and 5C, the locking member 162 may include a seating groove 1621 and a receiving groove 1622. In this regard, the locking member 162 may have a two-stage structure that is incorporated step-by-step. The seating groove 1621 is an entrance portion of the locking member 162 and may be configured as a step so that the head of the cap 170 is seated thereon. For example, when viewed from above, the seating groove 1621 may be concentric with the receiving groove 1622 and may have a greater diameter than the receiving groove 1622. The receiving groove 1622 may have a shape connected to the seating groove 1621 and recessed deeper. For example, the receiving groove 1622 may have a pocket-like shape. Therefore, the head of the locking structure 160 that does not pass through the fastener 1629 may be accommodated in the seating groove 1621.

An auxiliary groove 1627 may be provided on the inner surface of the receiving groove 1622. The auxiliary groove 1627 may extend vertically from the bottom surface of the seating groove 1621. A protrusion 172 of the cap 170 may be located in the auxiliary groove 1627. A rib 1626 for catching the protrusion 172 may protrude from the auxiliary groove 1627. Therefore, as at least one protrusion protruding to the outside of the protrusion 172 is caught by the rib 1626, the cap 170 may be coupled to the locking member 162.

The lower casing 111b may include a locking groove 1625. The locking groove 1625 may correspond to the through hole 164 of the substrate 112. One end of the locking structure 160 may be fixed to the locking groove 1625. For example, one end of the locking structure 160 inserted into the locking member 162 of the upper casing 111a may pass through the through hole 164 of the substrate 112 and be fixed to the locking groove 1625. When a screw thread is formed on one end of the locking structure 160, a screw thread corresponding to the screw thread of the locking structure 160 may be formed on the inner surface of the locking groove 1625.

In FIG. 4B, the storage controller 120 includes the sensing pin 122, and the sensing pin 122 may receive an electrical signal from the security pad 113. A pad and/or a pin refers to a contact pad and/or a contact pin, and an electrical signal may be a current signal and/or a voltage signal. The level of the electrical signal is dependent on a resistance value that changes based on whether there is an electrical contact between the security pad 113 and the locking structure 160. To this end, the security pad 113 and the locking structure 160 may each include a resistive material having a unique resistance value.

The security pad 113, the locking structure 160, and the sensing pin 122 may provide a single physical sensing structure to improve the security performance of the storage device 110. The storage controller 120, which includes the plurality of locking structures 160, may include a plurality of physical sensing structures. In detail, as described later with reference to FIGS. 6A to 7B, when at least a portion of the casing 111 is removed (or separated, opened, or damaged) (for example, when the upper casing 111a is removed), a change in the electrical signal may be detected, and a data protection operation may be performed on the non-volatile memory device 130.

FIGS. 6A, 6B, 7A, and 7B are diagrams for describing the data protection operation of the storage device of FIG. 1. FIGS. 6A to 7B illustrate a data protection operation using the locking structure 160 and the sensing pin 122 of FIG. 4B.

Figure 6A:
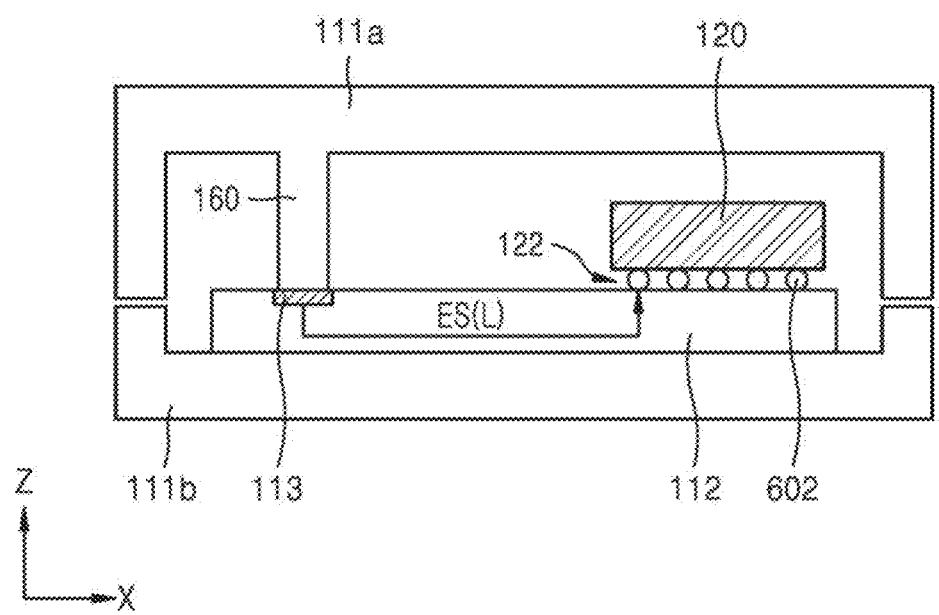
FIGS. 6A, 6B, 7A, and 7B are diagrams for describing the data protection operation of the storage device of FIG. 1.

Referring to FIG. 6A, the substrate 112 may be mounted on and fixed to the lower casing 111b. Although FIG. 6A shows that the substrate 112 is in direct contact with the lower casing 111b, embodiments are not limited thereto and the substrate 112 and the lower casing 111b may be spaced apart from each other and at least one separation space may be provided between the substrate 112 and the lower casing 111b. The storage controller 120 may be mounted on the substrate 112 via conductive bumps 602, e.g., solder bumps. One of the conductive bumps 602 may function as the sensing pin 122. The storage controller 120 and the upper casing 111a may be spaced apart from each other to form at least one separation space. The security pad 113 may be disposed within substrate 112. The locking structure 160 may be formed at the upper casing 111a. The locking structure 160 may be in direct contact with the security pad 113 or in indirect contact with the security pad 113 through a wire, and the level of an electrical signal ES sensed by the sensing pin 122 may be changed depending on whether the security pad 113 and the locking structure 160 electrically contact each other (i.e., electrically connected).

Figure 6B:
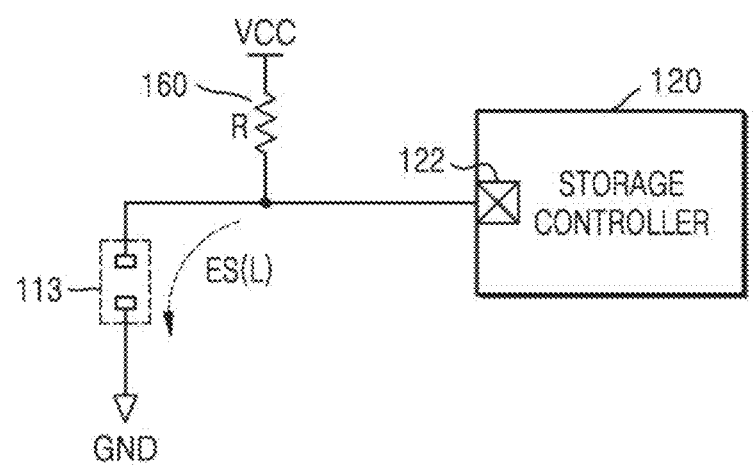

As shown in FIG. 6B, the sensing pin 122 of the storage controller 120 may be connected between the security pad 113 and the locking structure 160 that are connected to each other. A resistor R may represent the resistor of the locking structure 160. The security pad 113 may be connected to a ground voltage GND, and the resistor R may be connected to a power voltage VCC. When the security pad 113 and the locking structure 160 are in electrical contact with each other (i.e., when the casing 111 is not opened or damaged and the upper casing 111a and lower casing 111b are coupled to each other), the sensing pin 122 of the storage controller 120 is connected to the ground voltage GND through the security pad 113, and thus the electrical signal ES may have a first logic level (e.g., a low level L) equal to the level of the ground voltage GND. In this case, a data protection operation for the non-volatile memory device 130 is not performed.

Figure 7A:
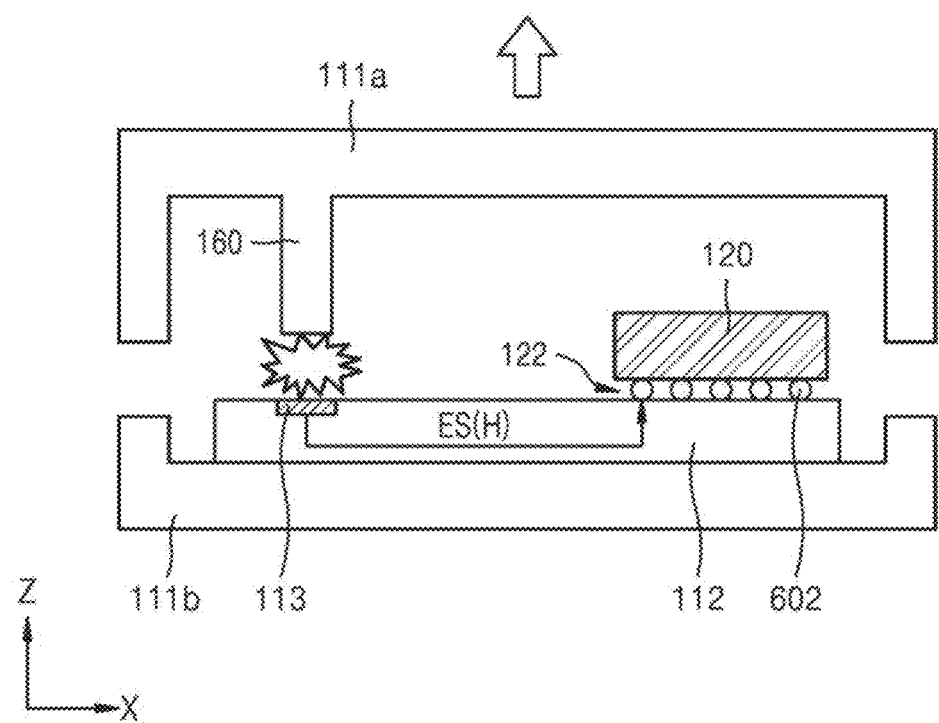
Figure 7B:
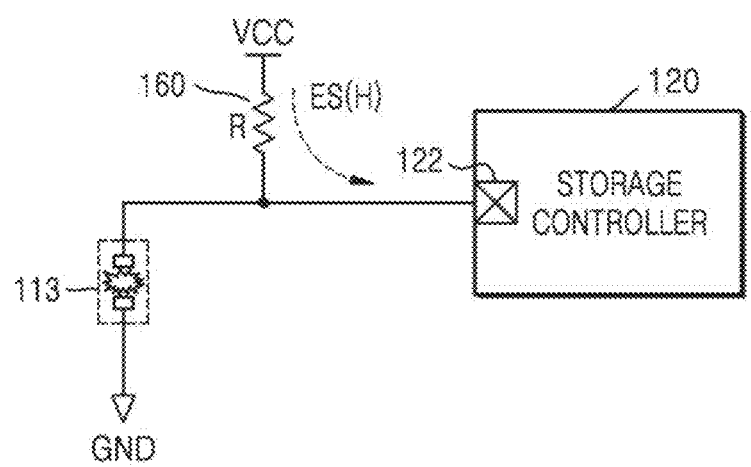

Referring to FIGS. 7A and 7B, when the upper casing 111a is removed or separated and the security pad 113 and the locking structure 160 are not in electrical contact with each other, the resistance value of the locking structure 160 is changed and the level of the electrical signal ES is changed, and the sensing pin 122 of the storage controller 120 may receive the electrical signal ES having a second logic level (e.g., a high level H) equal to the level of the power voltage VCC. When the sensing pin 122 receives the electrical signal ES having the second logic level, a data protection operation on the non-volatile memory device 130 may be performed.

The storage controller 120 may set a security level according to the voltage level of the sensing pin 122. For example, the storage controller 120 may set two or more security levels (e.g., a first security level and a second security level). When the voltage level of the sensing pin 122 is lower than a reference voltage level, the storage controller 120 may perform a data protection operation on the non-volatile memory device 130 according to the first security level, which is a relatively low security level. A data protection operations according to the first security level may include an operation for blocking access to data stored in the non-volatile memory device 130. When the voltage level of the sensing pin 122 is higher than a reference voltage level, the storage controller 120 may perform a data protection operation on the non-volatile memory device 130 according to the second security level, which is a relatively high security level. A data protection operations according to the second security level may include operations for blocking output of or erasing encryption keys stored in the non-volatile memory device 130.

Although the storage controller 120 performs different data protection operations for respective security levels, as will be described later with reference to FIGS. 8, 9, 10, 11, and 12, an operation for erasing encrypted data stored in the non-volatile memory device 130 is not included in some embodiments. Therefore, encrypted data stored in the non-volatile memory device 130 may continue to be stored and accessible even after a data protection operation. The storage controller 120 may enter a management mode to maintain encrypted data stored in the non-volatile memory device 130 when security stability is ensured. In the management mode, the storage controller 120 may allow access to the first encrypted security key 1ST ENC_SEC_KEY and the second security key 2ND SEC_KEY stored in the non-volatile memory device 130, activate the first security key generator 127a that generates the first security key 1ST SEC_KEY, and activate the second security key generator 127b that generates the second security key 2ND SEC_KEY. Therefore, the storage controller 120 may continuously maintain encrypted data stored in the non-volatile memory device 130.

FIGS. 8, 9, 10, 11, and 12 are diagrams for describing data protection operations performed by a storage device, according to embodiments. FIGS. 8, 9, 10, 11, and 12 illustrate data protection operations when the storage device 110 is powered on. Data protection operations of FIGS. 8, 9, 10, 11, and 12 may be selectively performed depending on the security level. For example, data protection operations of FIGS. 8, 9, 10, and 11 may be performed according to the first security level, and a data protection operation of FIG. 12 may be performed according to the second security level.

Figure 8:
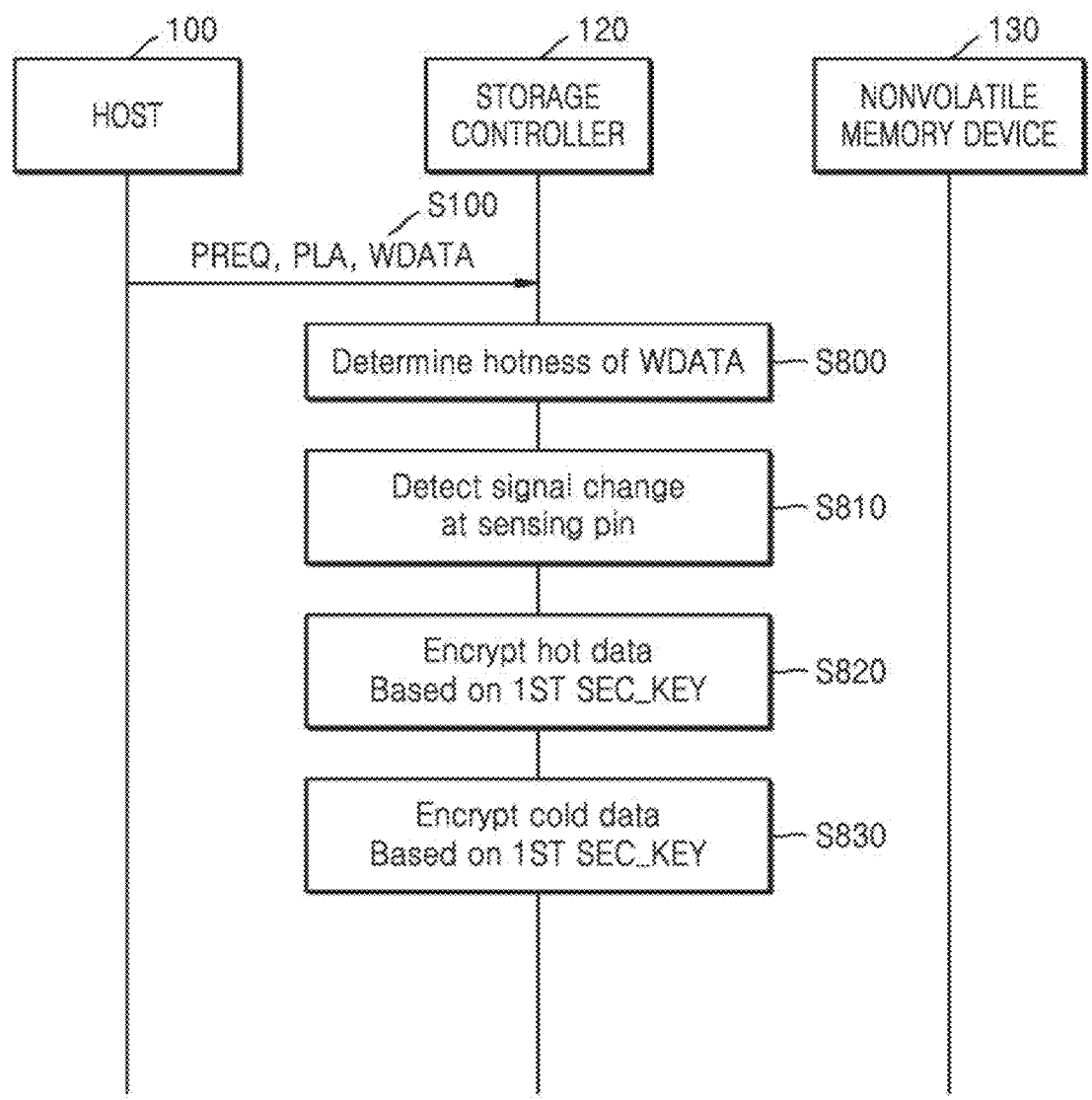
FIGS. 8, 9, 10, 11, and 12 are diagrams for describing data protection operations performed by a storage device, according to embodiments.

Referring to FIG. 8, the storage controller 120 may receive the program request PREQ and the program logical address PLA and the write data WDATA corresponding to the program request PREQ from the host 100 (operation S100). The storage controller 120 may determine the hotness of the write data WDATA received from the host 100 (operation S800). The hotness may refer to an index value indicating the degree to which the program logical address PLA of the write data WDATA is frequently accessed. The storage controller 120 may determine the hotness for each program logical address PLA based on the frequency and the recency that the corresponding program logical address PLA is accessed. The write data WDATA may be classified into hot data, which is frequently accessed data, or cold data, which is barely accessed, depending on the hotness of the corresponding program logical address PLA.

The storage controller 120 may detect a signal change at the sensing pin 122 (operation S810). When at least a portion of the casing 111 of the storage device 110 is removed, separated, opened, or damaged, the signal of the sensing pin 122 may be changed, for example, from a first logic level to a second logic level. When a signal change at the sensing pin 122 is detected (i.e., when at least one physical sensing structure is damaged), the storage controller 120 may encrypt hot data based on the first security key 1ST SEC_KEY (operation S820) and encrypt thereafter cold data based on the first security key 1ST SEC_KEY (operation S830). Therefore, the storage controller 120 may perform data protection operations on the hot data and the cold data. Although the data protection operation is described that hot data is encrypted first (operation S820) and cold data is encrypted thereafter, embodiments are not limited thereto, and only hot data may be encrypted.

Figure 9:
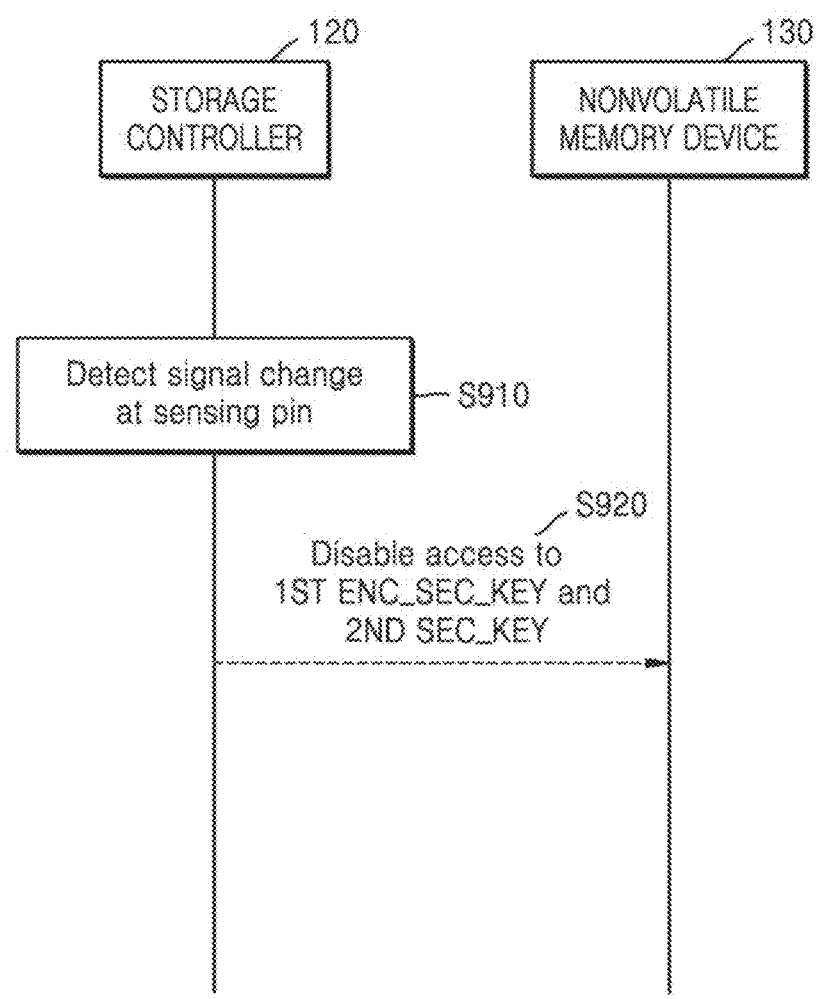

Referring to FIG. 9, the storage controller 120 may detect a signal change at the sensing pin 122 (operation S910). When at least a portion of the casing 111 of the storage device 110 is removed, separated, opened, or damaged, the signal of the sensing pin 122 may be changed, for example, from a first logic level to a second logic level. When a signal change at the sensing pin 122 is detected (i.e., when at least one physical sensing structure is damaged), the storage controller 120 may block accesses (e.g., data read and data modification) to the first encrypted security key 1ST ENC_SEC_KEY and the second security key 2ND SEC_KEY stored in the non-volatile memory device 130 (operation S920). Therefore, the storage controller 120 may perform a data protection operation by preventing the leakage of the first encrypted security key 1ST ENC_SEC_KEY and the second security key 2ND SEC_KEY.

Figure 10:
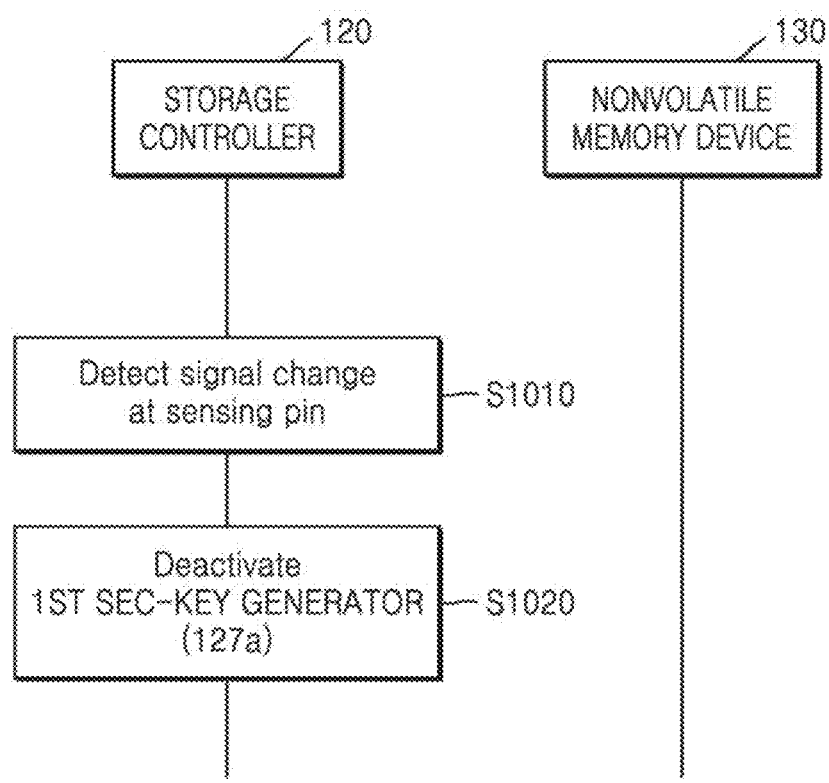

Referring to FIG. 10, the storage controller 120 may detect a signal change at the sensing pin 122 (operation S1010). When at least a portion of the casing 111 of the storage device 110 is removed, separated, opened, or damaged, the signal of the sensing pin 122 may be changed, for example, from a first logic level to a second logic level. When a signal change at the sensing pin 122 is detected (i.e., when at least one physical detection structure is damaged), the storage controller 120 may deactivate the first security key generator 127a that generates the first security key 1ST SEC_KEY (operation S1020). The processor 125 may provide a deactivated first enable signal EN1 to the first security key generator 127a to deactivate the first security key generator 127a. Therefore, the storage controller 120 may perform a data protection operation on the first encrypted security key 1ST ENC_SEC_KEY.

Figure 11:
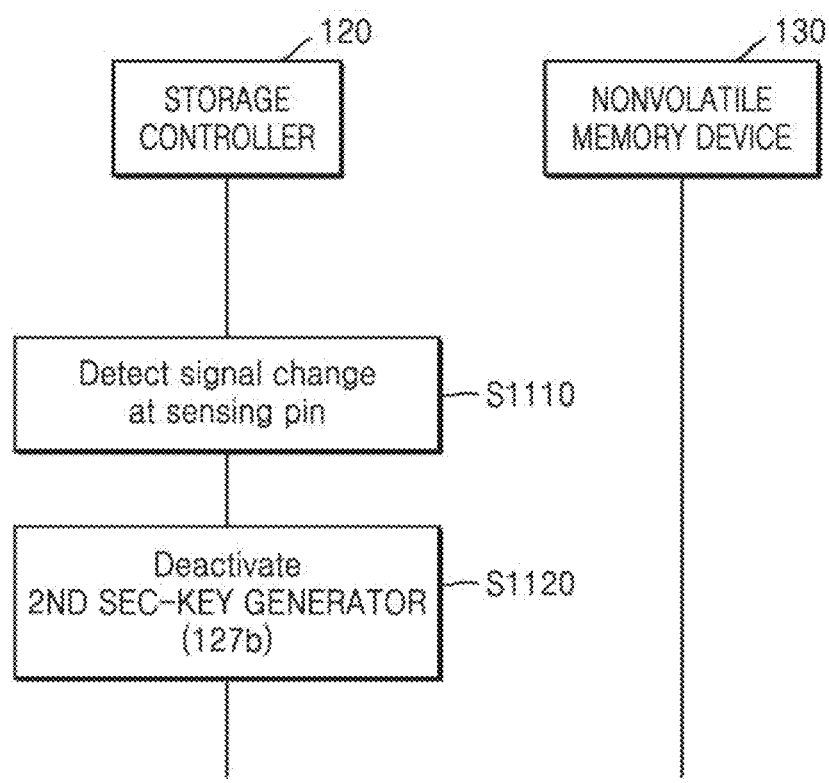

Referring to FIG. 11, the storage controller 120 may detect a signal change at the sensing pin 122 (operation S1110). When at least a portion of the casing 111 of the storage device 110 is removed, separated, opened, or damaged, the signal of the sensing pin 122 may be changed, for example, from a first logic level to a second logic level. When a signal change at the sensing pin 122 is detected (i.e., when at least one physical detection structure is damaged), the storage controller 120 may deactivate the second security key generator 127b that generates the second security key 2ND SEC_KEY (operation S1120). The processor 125 may provide a deactivated second enable signal EN2 to the second security key generator 127b to deactivate the second security key generator 127b. Therefore, the storage controller 120 may perform a data protection operation on the second security key 2ND SEC_KEY.

Figure 12:
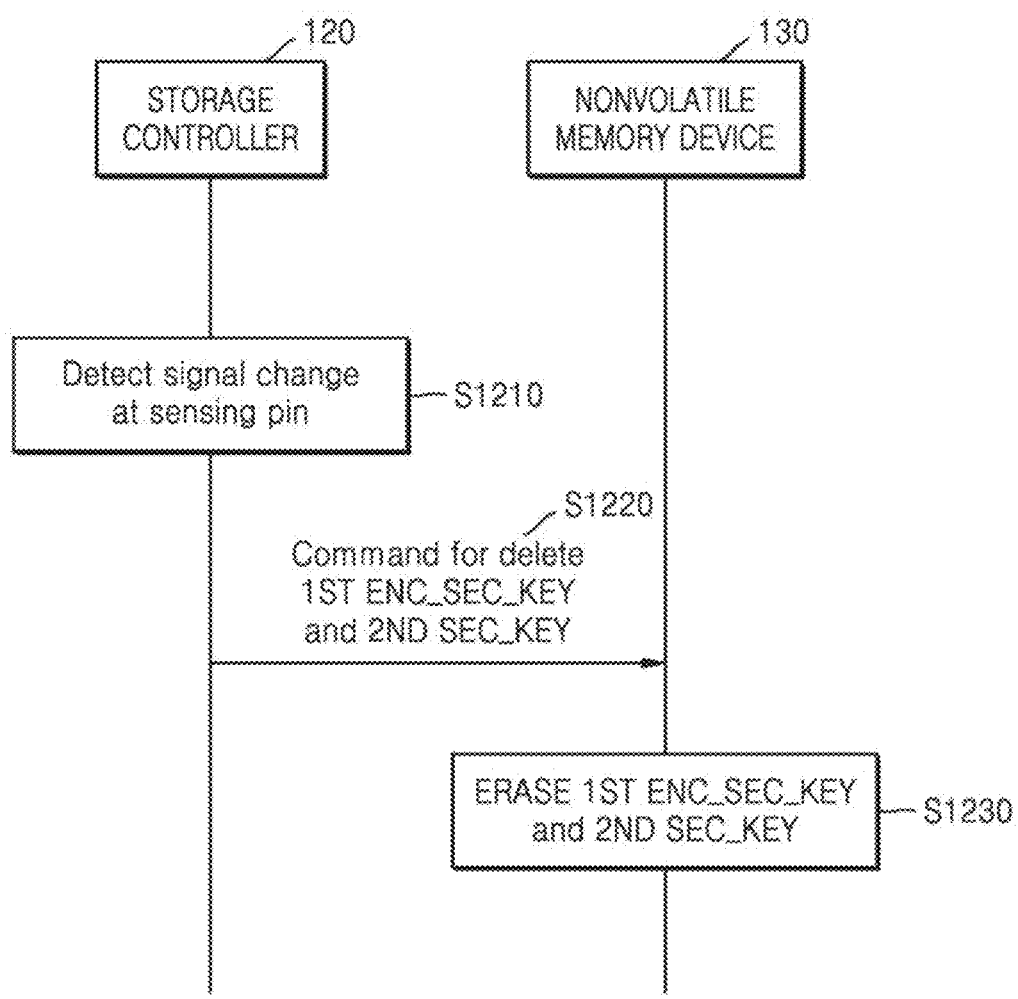

Referring to FIG. 12, the storage controller 120 may detect a signal change at the sensing pin 122 (operation S1210). When at least a portion of the casing 111 of the storage device 110 is removed, separated, opened, or damaged, the signal of the sensing pin 122 may be changed, for example, from a first logic level to a second logic level. When a signal change at the sensing pin 122 is detected (i.e., when at least one physical sensing structure is damaged), the storage controller 120 may transmit a command (e.g., an erase command) to erase the first encrypted security key 1ST ENC_SEC_KEY and the second security key 2ND SEC_KEY stored in the non-volatile memory device 130 to the non-volatile memory device 130 (operation S1220). The non-volatile memory device 130 may receive the erase command and perform an erase operation on the first encrypted security key 1ST ENC_SEC_KEY and the second security key 2ND SEC_KEY (operation S1230). Therefore, the storage controller 120 may erase the first encrypted security key 1ST ENC_SEC_KEY and the second security key 2ND SEC_KEY stored in the non-volatile memory device 130 to make encrypted data inaccessible.

FIGS. 13A, 13B, 13C, 14, and 15 are diagrams for describing data protection operations performed by a storage device, according to embodiments. FIGS. 13A, 13B, 13C, 14, and 15 are diagrams for describing data protection operations when the storage device 110 of FIG. 1 is powered off. In FIGS. 13A, 13B, 13C, 14, and 15, data protection operations may be performed by using a sensing capacitor.

Figure 13A:
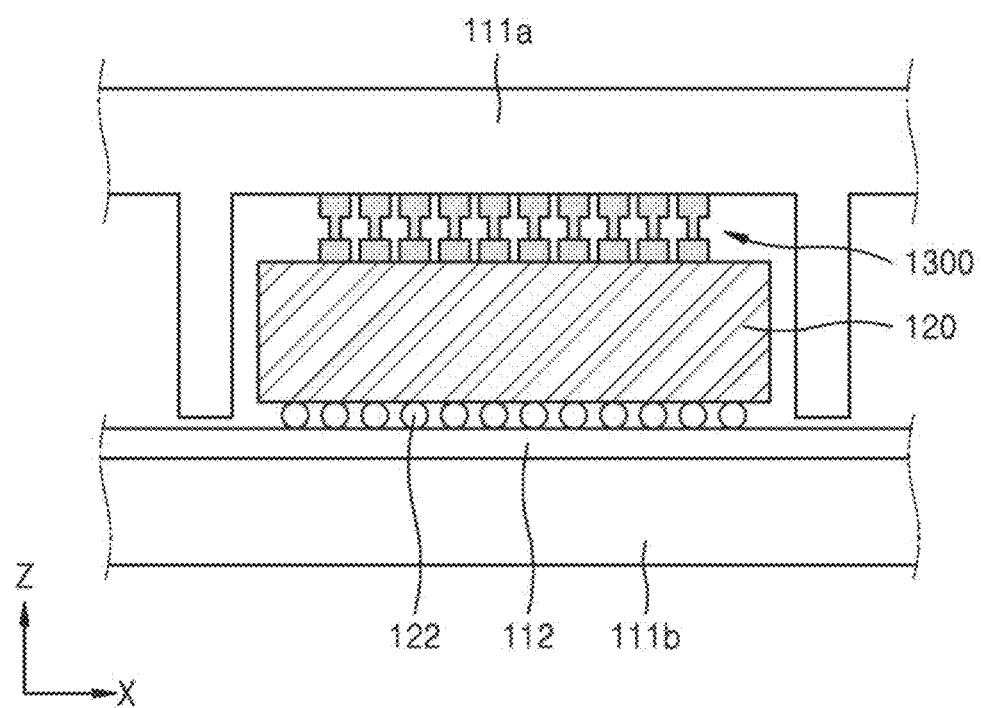
FIGS. 13A, 13B, 13C, 14, and 15 are diagrams for describing data protection operations performed by a storage device, according to embodiments.

Referring to FIG. 13A, the substrate 112 may be mounted on and fixed to the lower casing 111b. The storage controller 120 is mounted on the substrate 112 and may be integrally coupled to the upper casing 111a by a sensing capacitor 1300. The sensing capacitor 1300 may be disposed between the storage controller 120 and the upper casing 111a. The sensing capacitor 1300 may be connected to the sensing pin 122 of the storage controller 120. When the sensing capacitor 1300 is separated or removed from the upper casing 111a or the storage controller 120, the capacitance of the sensing capacitor 1300 may change. The sensing pin 122 may detect a change in capacitance of the sensing capacitor 1300. Although it is described that the sensing capacitor 1300 is disposed on the storage controller 120, embodiments are not limited thereto, and the sensing capacitor 1300 may be disposed on the plurality of electronic components (e.g., 120, 130, and 140) of the storage device 110.

Figure 13B:
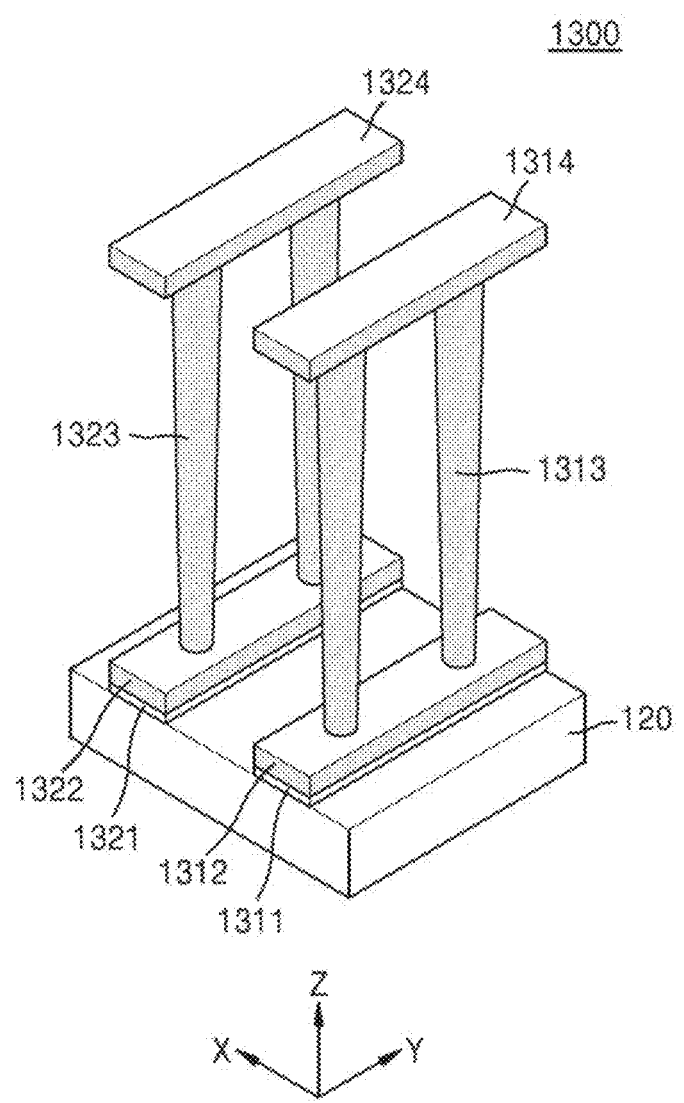

FIG. 13B is a perspective view of an example of the sensing capacitor 1300. Referring to FIG. 13B, a first insulation material 1311 and a second insulation material 1321 extending in a second direction (Y direction) and spaced apart from each other in the first direction (X direction) may be provided on the storage controller 120. The first insulation material 1311 and the second insulation material 1321 may be arranged parallel to each other. A first conductive pattern 1312 extending in the second direction (Y direction) may be disposed on the first insulation material 1311. A second conductive pattern 1322 extending in the second direction (Y direction) may be disposed on the second insulation material 1321. The first conductive pattern 1312 and the second conductive pattern 1322 may be spaced apart from each other in the first direction (X direction). The first conductive pattern 1312 and the second conductive pattern 1322 may be arranged parallel to each other. For example, the first conductive pattern 1312 and the second conductive pattern 1322 may include polysilicon.

A third conductive pattern 1314 may be provided on the first conductive pattern 1312. The first conductive pattern 1312 and the third conductive pattern 1314 may be connected to each other through first contacts 1313. A fourth conductive pattern 1324 may be provided on the second conductive pattern 1322. The second conductive pattern 1322 and the fourth conductive pattern 1324 may be connected to each other through second contacts 1323. For example, the third conductive pattern 1314 and the fourth conductive pattern 1324 may be provided as parts of metal wires.

Because the first contacts 1313 and the second contacts 1323 are arranged immediately adjacent to each other, capacitive coupling may be formed between the first contacts 1313 and the second contacts 1323. The sensing capacitor 1300 may be formed by using the first contacts 1313 and the second contacts 1323. The third conductive pattern 1314 may be connected to the sensing pin 122. The fourth conductive pattern 1324 may be connected to a ground node. For example, the ground voltage GND may be fixedly supplied to the fourth conductive pattern 1324. Therefore, a certain voltage level determined according to the capacitance and a charge amount of the sensing capacitor 1300 may be set to the sensing pin 122. According embodiments, first to third directions are shown, but the first to third directions of FIG. 13 may coincide with or differ from the first to third directions of FIG. 4B. The first to third directions are used in the individual drawings to distinguish different directions, and are not limited to pointing to the same directions throughout embodiments described herein.

Figure 13C:
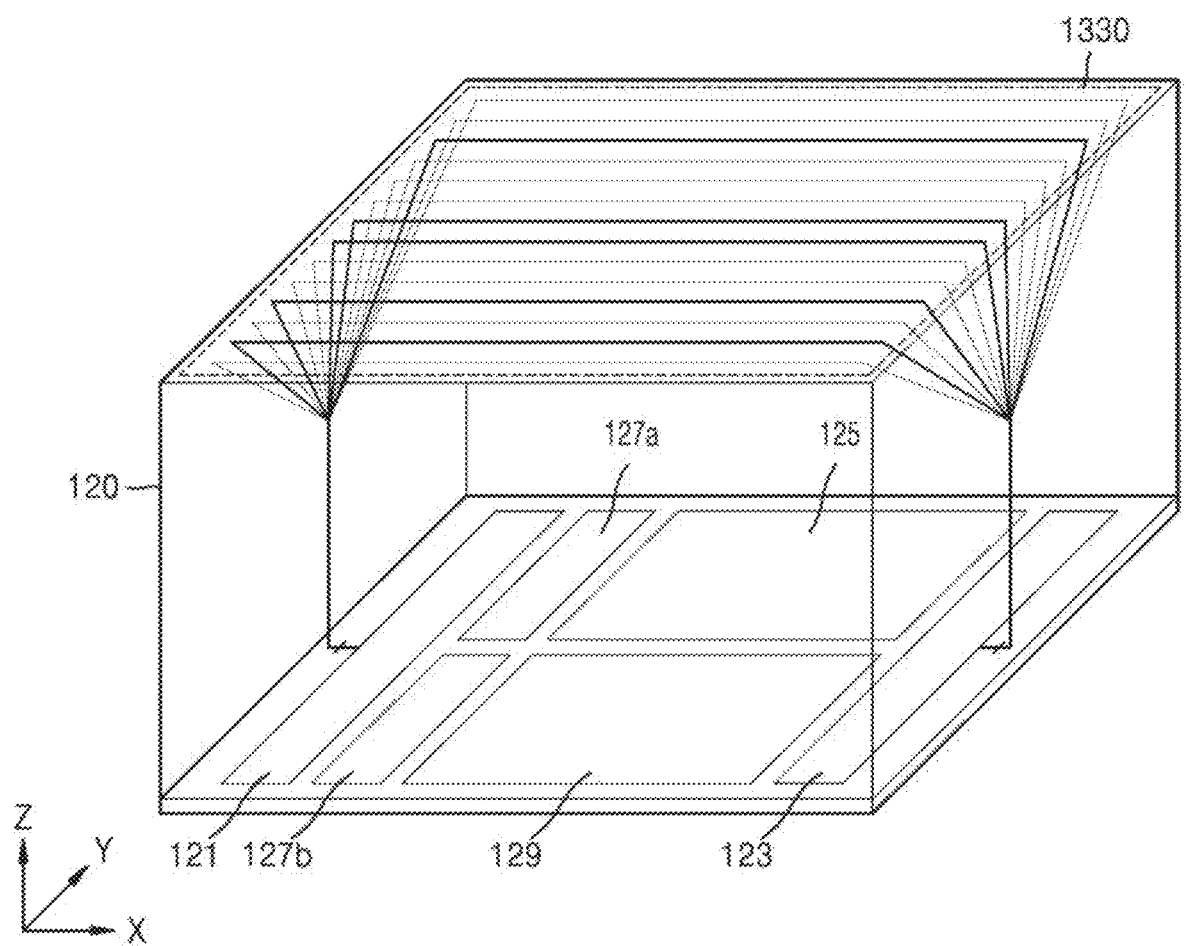

Referring to FIG. 13C, the storage controller 120 includes a sensing capacitor 1330, and the sensing capacitor 1330 may include a plurality of conductors arranged on integrated circuits (e.g., 121, 123, 125, 127a, 127b, and 129) inside the storage controller 120. The sensing capacitor 1330 may be connected to the sensing pin 122 of the storage controller 120. The sensing capacitor 1330 may be provided to detect an invasive attack on the storage controller 120. The capacitance of the sensing capacitor 1330 may change when a plurality of conductors are deformed, separated, or removed. The sensing pin 122 may detect a change in the capacitance of the sensing capacitor 1330. Although it is described that the sensing capacitor 1330 is disposed inside the storage controller 120, embodiments are not limited thereto, and the sensing capacitor 1330 may be disposed on the plurality of electronic components (e.g., 120, 130, and 140) of the storage device 110.

In FIGS. 13A and 13C, when at least a portion of the upper casing 111a is removed (or separated, opened, or damaged), capacitances of the sensing capacitors 1300 and 1330 may change. The voltage level of the sensing pin 122 may be changed due to the changes in the capacitances of the sensing capacitors 1300 and 1330. For example, the voltage level of the sensing pin 122 may be lowered. The storage controller 120 may detect a signal change at the sensing pin 122 and perform data protection operations on the non-volatile memory device 130 by using the auxiliary power supply 150. As described above with reference to FIGS. 8, 9, 10, 11, and 12, the data protection operations may include operations for blocking access to data stored in the non-volatile memory device 130 and/or operations for erasing encryption keys stored in the non-volatile memory device 130.

Figure 14:
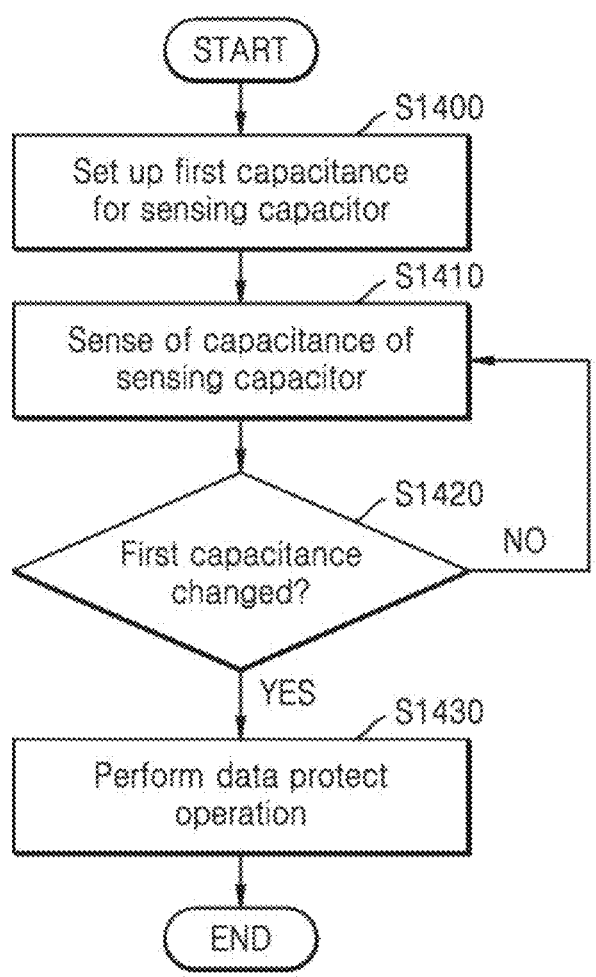

Referring to FIG. 14, the storage device 110 may set a first capacitance of the sensing capacitors 1300 and 1330 provided during manufacturing of the storage device 110 (operations S1400). The storage device 110 may detect the capacitances of the sensing capacitors 1300 and 1330 (operation S1410). When changes in the capacitances of the sensing capacitors 1300 and 1330 are detected (operation S1420), a signal change at the sensing pin 122 of the storage controller 120 may be detected. The storage controller 120 may detect a signal change at the sensing pin 122 and perform data protection operations on the non-volatile memory device 130 by using the auxiliary power supply 150 (operation S1430). In performing the data protection operations, the storage controller 120 may encrypt the hot data and the cold data as described above with reference to FIG. 8, block accesses (data read and data write) to the first encrypted security key 1ST ENC_SEC_KEY and the second security key 2ND SEC_KEY stored in the non-volatile memory device 130 as described above with reference to FIG. 9, deactivate the first security key generator 127a and the second security key generator 127b as described above with reference to FIGS. 10 and 11, and erase the first encrypted security key 1ST ENC_SEC_KEY and the second security key 2ND SEC_KEY stored in the non-volatile memory device 130 as described above with reference to FIG. 12.

Figure 15:
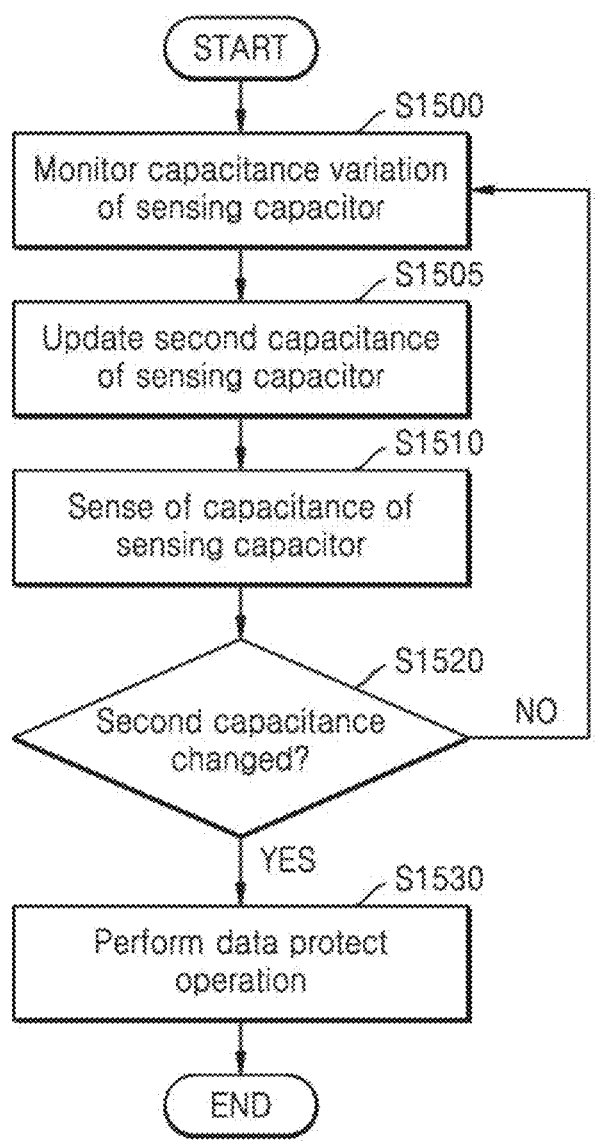

Referring to FIG. 15, the storage device 110 monitors changes in the capacitances of the sensing capacitors 1300 and 1330 while the storage device 110 is in use (operation S1500), and, when a change is determined as an acceptable change based on a monitoring result, the storage device 110 may update the capacitances of the sensing capacitor 1300 to a second capacitance (operation S1502). Thereafter, the storage device 110 may detect changes in the capacitances of the sensing capacitors 1300 and 1330 (operation S1510). When changes in the capacitance of the sensing capacitors 1300 and 1330 are detected (operation S1520), a signal change at the sensing pin 122 of the storage controller 120 may be detected. The storage controller 120 may detect a signal change at the sensing pin 122 and perform data protection operations on the non-volatile memory device 130 by using the auxiliary power supply 150 (operation S1530). In performing the data protection operations, the storage controller 120 may encrypt the hot data and the cold data as described above with reference to FIG. 8, block accesses (data read and data write) to the first encrypted security key 1ST ENC_SEC_KEY and the second security key 2ND SEC_KEY stored in the non-volatile memory device 130 as described above with reference to FIG. 9, deactivate the first security key generator 127a and the second security key generator 127b as described above with reference to FIGS. 10 and 11, and erase the first encrypted security key 1ST ENC_SEC_KEY and the second security key 2ND SEC_KEY stored in the non-volatile memory device 130 as described above with reference to FIG. 12.

Figure 16:
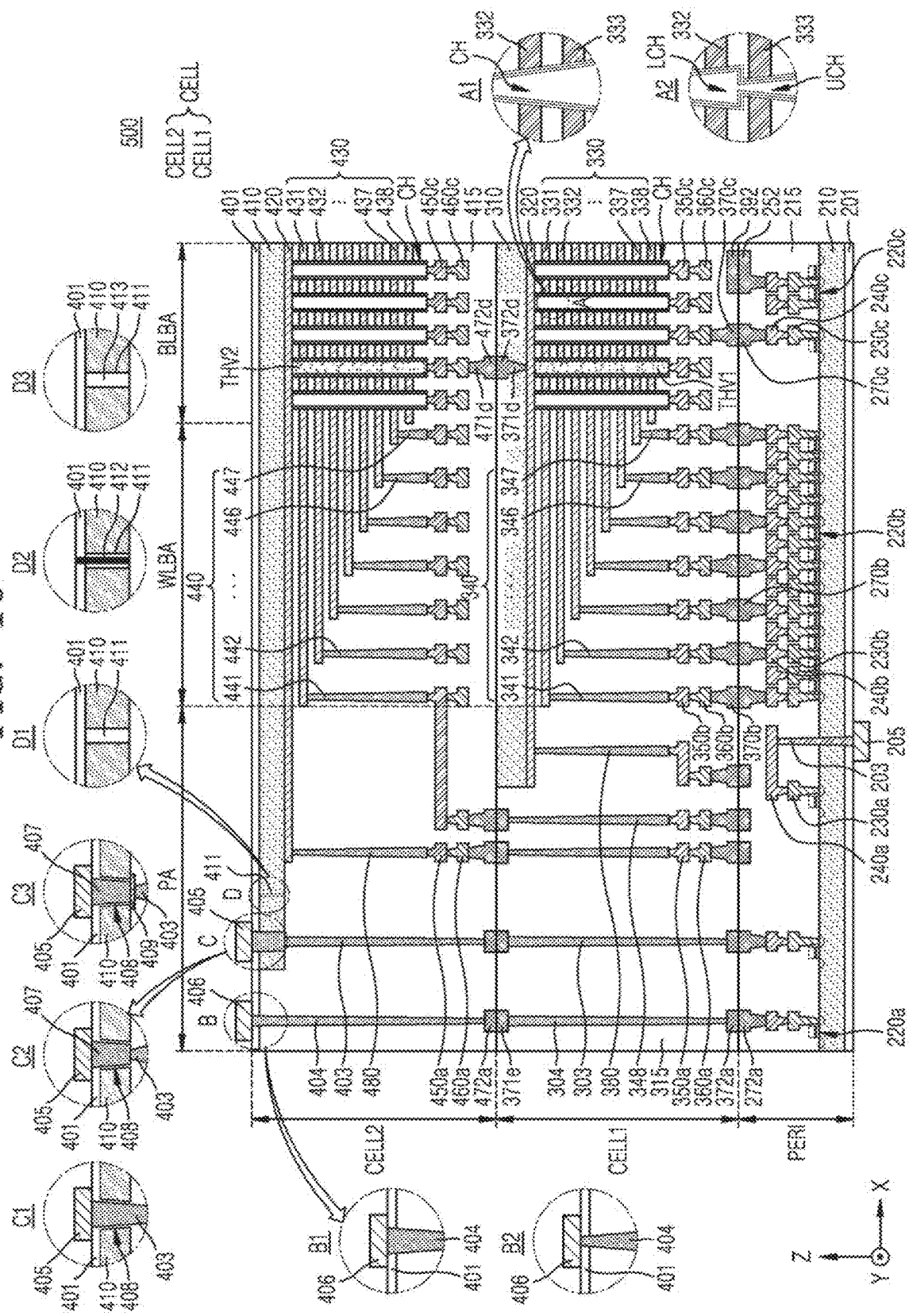
FIG. 16 is a cross-sectional view of a memory device having a bonding vertical NAND (B-VNAND) structure, according to an embodiment.

FIG. 16 is a view illustrating a memory device 500 according to some embodiments.

Referring to FIG. 16, a memory device 400 may have a chip-to-chip (C2C) structure. The C2C structure may refer to a structure formed by manufacturing an upper chip including a cell region CELL on a first wafer, manufacturing a lower chip including a peripheral circuit region PERI on a second wafer, different from the first wafer, and then connecting the upper chip and the lower chip in a bonding manner. For example, the bonding manner may include a method of electrically connecting a bonding metal formed on an uppermost metal layer of the upper chip and a bonding metal formed on an uppermost metal layer of the lower chip. For example, when the bonding metals may be formed of copper (Cu), the bonding manner may be a Cu—Cu bonding, and the bonding metals may also be formed of aluminum or tungsten.

Each of the peripheral circuit region PERI and the cell region CELL of the memory device 40 may include an external pad bonding area PA, a word line bonding area WLBA, and a bit line bonding area BLBA.

The peripheral circuit region PERI may include a first substrate 210, an interlayer insulating layer 215, a plurality of circuit elements 220a, 220b, and 220c formed on the first substrate 210, first metal layers 230a, 230b, and 230c respectively connected to the plurality of circuit elements 220a, 220b, and 220c, and second metal layers 240a, 240b, and 240c formed on the first metal layers 230a, 230b, and 230c. In an example embodiment, the first metal layers 230a, 230b, and 230c may be formed of tungsten having relatively high resistance, and the second metal layers 240a, 240b, and 240c may be formed of copper having relatively low resistance.

In an example embodiment illustrated in FIG. 16, although the first metal layers 230a, 230b, and 230c and the second metal layers 240a, 240b, and 240c are shown and described, they are not limited thereto, and one or more metal layers may be further formed on the second metal layers 240a, 240b, and 240c. At least a portion of the one or more metal layers formed on the second metal layers 240a, 240b, and 240c may be formed of aluminum or the like having a lower resistance than those of copper forming the second metal layers 240a, 240b, and 240c.

The interlayer insulating layer 215 may be disposed on the first substrate 210 and cover the plurality of circuit elements 220a, 220b, and 220c, the first metal layers 230a, 230b, and 230c, and the second metal layers 240a, 240b, and 240c. The interlayer insulating layer 215 may include an insulating material such as silicon oxide, silicon nitride, or the like.

Lower bonding metals 271b and 272b may be formed on the second metal layer 240b in the word line bonding area WLBA. In the word line bonding area WLBA, the lower bonding metals 271b and 272b in the peripheral circuit region PERI may be electrically connected to upper bonding metals 371b and 372b in the cell region CELL in a bonding manner, and the lower bonding metals 271b and 272b and the upper bonding metals 371b and 372b may be formed of aluminum, copper, tungsten, or the like.

The cell region CELL may include at least one memory block. The cell region CELL may include a second substrate 310 and a common source line 320. On the second substrate 310, a plurality of word lines 331 to 338 (i.e., 330) may be stacked in a direction (a Z-axis direction), perpendicular to an upper surface of the second substrate 310. At least one string select line and at least one ground select line may be arranged on and below the plurality of word lines 330, respectively, and the plurality of word lines 330 may be disposed between the at least one string select line and the at least one ground select line.

In the bit line bonding area BLBA, a channel structure CH may extend in a direction, perpendicular to the upper surface of the second substrate 310, and pass through the plurality of word lines 330, the at least one string select line, and the at least one ground select line. The channel structure CH may include a data storage layer, a channel layer, a buried insulating layer, and the like, and the channel layer may be electrically connected to a first metal layer 350c and a second metal layer 360c. For example, the first metal layer 350c may be a bit line contact, and the second metal layer 360c may be a bit line. In an example embodiment, the bit line 360c may extend in a first direction (a Y-axis direction), parallel to the upper surface of the second substrate 310.

In an example embodiment illustrated in FIG. 16, an area in which the channel structure CH, the bit line 360c, and the like are disposed may be defined as the bit line bonding area BLBA. In the bit line bonding area BLBA, the bit line 360c may be electrically connected to the circuit elements 220c providing a page buffer 393 in the peripheral circuit region PERI. For example, the bit line 360c may be connected to upper bonding metals 371c and 372c in the cell region CELL, and the upper bonding metals 371c and 372c may be connected to lower bonding metals 271c and 272c connected to the circuit elements 220c of the page buffer 393.

In the word line bonding area WLBA, the plurality of word lines 330 may extend in a second direction (an X-axis direction), parallel to the upper surface of the second substrate 310, and may be connected to a plurality of cell contact plugs 341 to 347 (i.e., 340). The plurality of word lines 330 and the plurality of cell contact plugs 340 may be connected to each other in pads provided by at least a portion of the plurality of word lines 330 extending in different lengths in the second direction. A first metal layer 350b and a second metal layer 360b may be connected to an upper portion of the plurality of cell contact plugs 340 connected to the plurality of word lines 330, sequentially. The plurality of cell contact plugs 340 may be connected to the circuit region PERI by the upper bonding metals 371b and 372b of the cell region CELL and the lower bonding metals 271b and 272b of the peripheral circuit region PERI in the word line bonding area WLBA.

The plurality of cell contact plugs 340 may be electrically connected to the circuit elements 220b providing a row decoder 394 in the peripheral circuit region PERI. In an example embodiment, operating voltages of the circuit elements 220b providing the row decoder 394 may be different than operating voltages of the circuit elements 220c providing the page buffer 393. For example, operating voltages of the circuit elements 220c providing the page buffer 393 may be greater than operating voltages of the circuit elements 220b providing the row decoder 394.

A common source line contact plug 380 may be disposed in the external pad bonding area PA. The common source line contact plug 380 may be formed of a conductive material such as a metal, a metal compound, polysilicon, or the like, and may be electrically connected to the common source line 320. A first metal layer 350a and a second metal layer 360a may be stacked on an upper portion of the common source line contact plug 380, sequentially. For example, an area in which the common source line contact plug 380, the first metal layer 350a, and the second metal layer 360a are disposed may be defined as the external pad bonding area PA.

Input-output pads 205 and 305 may be disposed in the external pad bonding area PA. Referring to FIG. 16, a lower insulating film 201 covering a lower surface of the first substrate 210 may be formed below the first substrate 210, and a first input-output pad 205 may be formed on the lower insulating film 201. The first input-output pad 205 may be connected to at least one of the plurality of circuit elements 220a, 220b, and 220c disposed in the peripheral circuit region PERI through a first input-output contact plug 203, and may be separated from the first substrate 210 by the lower insulating film 201. In addition, a side insulating film may be disposed between the first input-output contact plug 203 and the first substrate 210 to electrically separate the first input-output contact plug 203 and the first substrate 210.

Referring to FIG. 16, an upper insulating film 301 covering the upper surface of the second substrate 310 may be formed on the second substrate 310, and a second input-output pad 305 may be disposed on the upper insulating film 301. The second input-output pad 305 may be connected to at least one of the plurality of circuit elements 220a, 220b, and 220c disposed in the peripheral circuit region PERI through a second input-output contact plug 303.

According to embodiments, the second substrate 310 and the common source line 320 may not be disposed in an area in which the second input-output contact plug 303 is disposed. Also, the second input-output pad 305 may not overlap the word lines 330 in the third direction (the Z-axis direction). Referring to FIG. 16, the second input-output contact plug 303 may be separated from the second substrate 310 in a direction, parallel to the upper surface of the second substrate 310, and may pass through the interlayer insulating layer 315 of the cell region CELL to be connected to the second input-output pad 305.

According to embodiments, the first input-output pad 205 and the second input-output pad 305 may be selectively formed. For example, the memory device 400 may include only the first input-output pad 205 disposed on the first substrate 210 or the second input-output pad 305 disposed on the second substrate 310. Alternatively, the memory device 400 may include both the first input-output pad 205 and the second input-output pad 305.

A metal pattern in an uppermost metal layer may be provided as a dummy pattern or the uppermost metal layer may be absent, in each of the external pad bonding area PA and the bit line bonding area BLBA, respectively included in the cell region CELL and the peripheral circuit region PERI.

In the external pad bonding area PA, the memory device 400 may include a lower metal pattern 273a, corresponding to an upper metal pattern 372a formed in an uppermost metal layer of the cell region CELL, and having the same shape as the upper metal pattern 372a of the cell region CELL, in an uppermost metal layer of the peripheral circuit region PERI. In the peripheral circuit region PERI, the lower metal pattern 273a formed in the uppermost metal layer of the peripheral circuit region PERI may not be connected to a contact. Similarly, in the external pad bonding area PA, an upper metal pattern, corresponding to the lower metal pattern formed in an uppermost metal layer of the peripheral circuit region PERI, and having the same shape as a lower metal pattern of the peripheral circuit region PERI, may be formed in an uppermost metal layer of the cell region CELL.

The lower bonding metals 271b and 272b may be formed on the second metal layer 240b in the word line bonding area WLBA. In the word line bonding area WLBA, the lower bonding metals 271b and 272b of the peripheral circuit region PERI may be electrically connected to the upper bonding metals 371b and 372b of the cell region CELL by a Cu—Cu bonding.

Further, the bit line bonding area BLBA, an upper metal pattern 392, corresponding to a lower metal pattern 252 formed in the uppermost metal layer of the peripheral circuit region PERI, and having the same shape as the lower metal pattern 252 of the peripheral circuit region PERI, may be formed in an uppermost metal layer of the cell region CELL. A contact may not be formed on the upper metal pattern 392 formed in the uppermost metal layer of the cell region CELL.

In an example embodiment, corresponding to a metal pattern formed in an uppermost metal layer in one of the cell region CELL and the peripheral circuit region PERI, a reinforcement metal pattern having the same shape as the metal pattern may be formed in an uppermost metal layer in another one of the cell region CELL and the peripheral circuit region PERI, and a contact may not be formed on the reinforcement metal pattern.

Figure 17:
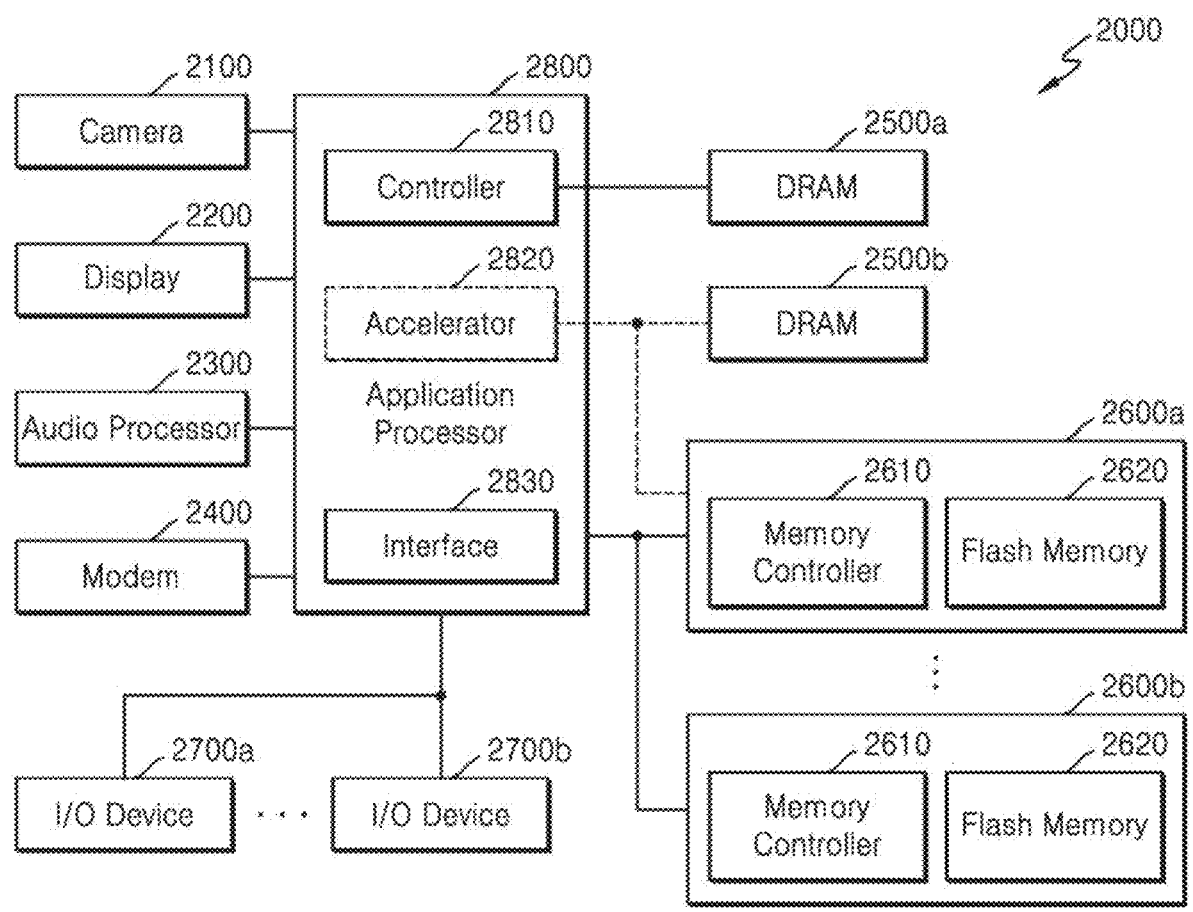
FIG. 17 is a block diagram of a system for describing an electronic device including a storage device according to embodiments.

FIG. 17 is a block diagram of a system 2000 for describing an electronic device including a storage device according to embodiments.

Referring to FIG. 17, the system 2000 may include a camera 2100, a display 2200, an audio processor 2300, a modem 2400, DRAMs 2500a and 2500b, flash memories 2600a and 2600b, I/O devices 2700a and 2700b, and an application processor (AP) 2800. The system 2000 may be implemented as a laptop computer, a mobile phone, a smartphone, a tablet PC, a wearable device, a healthcare device, or an Internet of Things (IoT) device. Also, the system 2000 may be implemented as a server or a PC.

The camera 2100 may capture a still image or a video according to a user's control and may store captured image/video data or transmit the captured image/video data to the display 2200. The audio processor 2300 may process audio data included in the flash memories 2600a and 2600b or network content. The modem 2400 may transmit a modulated signal for wired/wireless data transmission/reception to a receiver and the modulated signal may be demodulated by the receiver to restore an original signal. The I/O devices 2700a and 2700b may include devices providing a digital input function and/or digital output function, e.g., a Universal Serial Bus (USB), a storage, a digital camera, a Secure Digital (SD) card, a Digital Versatile Disc (DVD), a network adapter, a touch screen, etc.

The AP 2800 may control the overall operation of the system 2000. The AP 2800 may include a control block 2810, an accelerator block or accelerator chip 2820, and an interface block 2830. The AP 2800 may control the display 2200, such that a part of content stored in the flash memories 2600a and 2600b is displayed on the display 2200. When a user input is received through the I/O devices 2700a and 2700b, the AP 2800 may perform a control operation corresponding to the user input. The AP 2800 may include an accelerator block, which is a circuit dedicated for calculation of Artificial Intelligence (AI) data, or may include an accelerator chip 2820 separately from the AP 2800. The DRAM 2500b may be additionally provided in the accelerator block or the accelerator chip 2820. The accelerator block is a functional block that specializes in performing a particular function of the AP 2800 and may include a GPU, which is a functional block that specializes in processing graphic data, a neural processing unit (NPU), which is a block that specializes in AI calculation and inference, and a data processing unit (DPU), which is a block that specializes in data transmission.

The system 2000 may include a plurality of DRAMs 2500a and 2500b. The AP 2800 may set up a DRAM interface protocol and communicate with the DRAMs 2500a and 2500b to control the DRAMs 2500a and 2500b through commands complying with the Joint Electron Device Engineering Council (JEDEC) standard and mode register (MRS) setting or to use company-specific functions such as low voltage/high-speed/reliability and a cyclic redundancy check (CRC)/error correction code (ECC) function. For example, the AP 2800 may communicate with the DRAM 2500a through an interface complying with the JEDEC standards such as LPDDR4 and LPDDR5, and the accelerator block or the accelerator chip 2820 may set and use a new DRAM interface protocol to control the DRAM 2500b for an accelerator, which has a greater bandwidth than the DRAM 2500a.

Although FIG. 17 shows only the DRAMs 2500a and 2500b, embodiments are not limited thereto. As long as a bandwidth, a response speed, and voltage conditions of the AP 2800 or the accelerator chip 2820 are satisfied, any memory like a PRAM, an SRAM, an MRAM, an RRAM, an FRAM, or a Hybrid RAM may be used. The DRAMs 2500a and 2500b have relatively smaller latency and bandwidth than the I/O devices 2700a and 2700b or the flash memories 2600a and 2600b. The DRAMs 2500a and 2500b are initialized when the system 2000 is powered on and the OS and application data are loaded thereto, and thus the DRAMs 2500a and 2500b may be used as temporary storages for the OS and the application data or may be used as execution spaces for various software code.

In the DRAMs 2500a and 2500b, four arithmetic operations (i.e., addition, subtraction, multiplication, and division), vector calculations, address calculations, or Fast Fourier Transform (FFT) calculations may be performed. Also, in the DRAMs 2500a and 2500b, a function for an operation used for an inference may be performed. Here, the inference may be performed in a deep learning algorithm using an artificial neural network. The deep learning algorithm may include a training operation for learning a model through various data and an inference operation for recognizing data with the trained model. According to an embodiment, an image captured by a user through the camera 2100 is signal-processed and stored in the DRAM 2500b, and the accelerator block or accelerator chip 2820 may perform AI data calculation for recognizing data using data stored in the DRAM 2500b and a function used for inference.

The system 2000 may include a plurality of storages or flash memories 2600a and 2600b having a larger capacity than the DRAMs 2500a and 2500b. The accelerator block or accelerator chip 2820 may perform a training operation and an AI data calculation using the flash memories 2600a and 2600b. According to an embodiment, the flash memories 2600a and 2600b may include a memory controller 2610 and a flash memory device 2620, and a training operation and an inference AI data calculation performed by the AP 2800 and/or the accelerator chip 2820 may be performed more efficiently by using an arithmetic circuit included in the memory controller 2610. The flash memories 2600a and 2600b may store images captured through the camera 2100 or data transmitted through a data network. For example, the flash memories 2600a and 2600b may store Augmented Reality/Virtual Reality content, High Definition (HD) content, or Ultra High Definition (UHD) content.

In the system 2000, the flash memories 2600a and 2600b may refer to the storage devices described with reference to FIGS. 1 to 16. A storage device may detect an abnormal access to the storage device by using at least one physical detection structure and, when an abnormal access is detected, perform a data security operation of a corresponding security stage on data stored in the storage device. The storage device may be provided with a single physical sensing structure in which a security pad of a substrate and a locking structure are in electrical contact with each other. The storage device may provide a sensing capacitor that integrates a storage controller and a casing with each other or a sensing capacitor including a plurality of conductors inside a storage controller as another physical sensing structure. When at least a portion of the casing is removed, separated, opened, or damaged, the storage device may detect a signal change at a sensing pin due to a change in the electrical contact between the security pad and the locking structure or a change in the capacitance of the sensing capacitor. The storage device may determine a security level based on the signal change at the sensing pin and, according to the security level, perform a data protection operation for encrypting hot data and cold data in the order stated, blocking access to or output of security keys, or erasing the security keys. Therefore, even when the storage device is stolen, lost, or disposed of, data in the non-volatile memory device is not removed, and thus the data may be continuously used.

In some example embodiments, each of the components represented by a block as illustrated in FIGS. 1, 2A, 2B and 17, may be implemented as various numbers of hardware, and/or firmware structures that execute respective functions described above, according to example embodiments. For example, at least one of these components may include various hardware components including a digital circuit, a programmable or non-programmable logic device or array, an application specific integrated circuit (ASIC), transistors, capacitors, logic gates, or other circuitry using a direct circuit structure, such as a memory, a processor, a logic circuit, a look-up table, etc., that is configured to execute the respective functions through controls of one or more microprocessors or other control apparatuses. Also, at least one of these components may further include or may be implemented by a processor such as a central processing unit (CPU) that performs the respective functions, a microprocessor, or the like.

While aspects of embodiments have been particularly shown and described, it will be understood that various changes in form and details may be made therein without departing from the spirit and scope of the following claims.

What is claimed is:
1. A storage device comprising:
a substrate comprising at least one security pad;
at least one non-volatile memory device on the substrate; and
a storage controller on the substrate and comprising a sensing pin connected to the at least one security pad, wherein the storage controller is configured to:
control the at least one non-volatile memory device;
classify data corresponding to an input/output request for the at least one non-volatile memory device as hot data or cold data, based on an access frequency with respect to the data, wherein the hot data has a higher access frequency than the cold data;
encrypt write data to be stored in the at least one non-volatile memory device; and perform a data protection operation of encrypting the hot data, based on a signal change at the sensing pin according to a change in electrical contact of a physical sensing structure, the physical sensing structure comprising the at least one security pad and at least one locking structure, wherein a locking structure in electrical contact with a security pad extends through a through hole defined in the substrate.

2. The storage device of claim 1, wherein the data protection operation comprises encrypting the hot data and then encrypting the cold data.

3. The storage device of claim 1, wherein the storage controller comprises:
a first security key generation circuit configured to generate a first security key in response to a first enable signal, the first security key being used to encrypt the write data to generate encrypted write data; and
a second security key generation circuit configured to generate a second security key in response to a second enable signal, the second security key being used to encrypt the first security key to generate a first encrypted security key, and
wherein the storage controller is further configured to store the encrypted write data, the first encrypted security key, and the second security key in the at least one non-volatile memory device.

4. The storage device of claim 3, wherein the data protection operation comprises blocking access to the first encrypted security key or the second security key stored in the at least one non-volatile memory device.

5. The storage device of claim 3, wherein the data protection operation comprises deactivating the first security key generation circuit by deactivating the first enable signal.

6. The storage device of claim 3, wherein the data protection operation comprises deactivating the second security key generation circuit by deactivating the second enable signal.

7. The storage device of claim 3, wherein the data protection operation comprises transmitting an erase command to erase the first encrypted security key and the second security key stored in the at least one non-volatile memory device to the at least one non-volatile memory device, and
wherein the at least one non-volatile memory device is configured to perform an erase operation on the first encrypted security key and the second security key based on the erase command.

8. A storage device comprising:
a substrate;
at least one non-volatile memory device on the substrate; and
a storage controller on the substrate and comprising a sensing pin connected to a sensing capacitor, wherein the storage controller is configured to:
control the at least one non-volatile memory device;
classify data corresponding to an input/output request for the at least one non-volatile memory device as hot data or cold data, based on an access frequency with respect to the data, wherein the hot data has a higher access frequency than the cold data;
encrypt write data to be stored in the at least one non-volatile memory device; and
perform a data protection operation of encrypting the hot data, based on a signal change of the sensing pin according to a change in electrical contact of a physical sensing structure, the physical sensing structure comprising the sensing capacitor and the sensing pin,
wherein a locking structure in electrical contact with a security pad extends through the substrate.

9. The storage device of claim 8, wherein the data protection operation comprises encrypting the hot data and then encrypting the cold data.

10. The storage device of claim 8, wherein the sensing capacitor is between the storage controller and a casing surrounding the substrate, the at least one non-volatile memory device, and the storage controller.

11. The storage device of claim 8, wherein the sensing capacitor comprises a plurality of conductors inside the storage controller.

12. The storage device of claim 8, wherein the storage device further comprises an auxiliary power supply, and
wherein the storage controller is further configured to perform the data protection operation by using the auxiliary power supply.

13. The storage device of claim 8, wherein the storage controller comprises:
a first security key generation circuit configured to generate a first security key in response to a first enable signal, the first security key being used to encrypt the write data to generate encrypted write data; and
a second security key generation circuit configured to generate a second security key in response to a second enable signal, the second security key being used to encrypt the first security key to generate a first encrypted security key, and
wherein the storage controller is further configured to store the encrypted write data, the first encrypted security key, and the second security key in the at least one non-volatile memory device.

14. The storage device of claim 13, wherein the data protection operation comprises blocking access to the first encrypted security key or the second security key stored in the at least one non-volatile memory device.

15. The storage device of claim 13, wherein the data protection operation comprises deactivating the first security key generation circuit by deactivating the first enable signal.

16. The storage device of claim 13, wherein the data protection operation comprises deactivating the second security key generation circuit by deactivating the second enable signal.

17. The storage device of claim 13, wherein the data protection operation comprises transmitting an erase command to erase the first encrypted security key and the second security key stored in the at least one non-volatile memory device to the at least one non-volatile memory device, and
wherein the at least one non-volatile memory device is configured to perform an erase operation on the first encrypted security key and the second security key based on the erase command.

18. A method of operating a storage device that includes a storage controller, a sensing capacitor, a sensing pin connected to the sensing capacitor, at least one security pad connected to the sensing pin and provided on a substrate of the storage device, and a locking structure that is in electrical contact with a security pad and passes through the substrate, the method comprising:
generating and outputting a first security key and a second security key;
encrypting write data by using the first security key to generate encrypted write data;

encrypting the first security key by using the second security key to generate a first encrypted security key;

storing the first encrypted security key and the second security key in at least one non-volatile memory of the storage device;

detecting an abnormal access to the storage device based on a signal change at the sensing pin; and performing a data protection operation on data stored in the storage device based on the abnormal access being detected, wherein the data protection operation comprises blocking the second security key from being output.

19. The method of claim 18, wherein the data protection operation further comprises blocking output of the first security key.

20. The method of claim 18, wherein the at least one security pad connected to the sensing pin and the locking structure are configured to provide a single physical sensing structure, and wherein the method further comprises inducing the signal change by moving the locking structure.

\* \* \* \* \*